US008133108B2

(12) United States Patent
Iwamoto

(10) Patent No.: US 8,133,108 B2
(45) Date of Patent: Mar. 13, 2012

(54) GAMING MACHINE AND GAME CONTROL METHOD

(75) Inventor: Hideaki Iwamoto, Tokyo (JP)

(73) Assignee: Universal Entertainment Corporation, Tokyo (JP)

(*) Notice: Subject to any disclaimer, the term of this patent is extended or adjusted under 35 U.S.C. 154(b) by 1194 days.

(21) Appl. No.: 11/822,877

(22) Filed: Jul. 10, 2007

(65) Prior Publication Data

US 2008/0020820 A1 Jan. 24, 2008

(30) Foreign Application Priority Data

Jul. 11, 2006 (JP) ................................ 2006-190852

(51) Int. Cl.
*A63F 13/00* (2006.01)

(52) U.S. Cl. ................ 463/20; 463/17; 463/18; 463/32

(58) Field of Classification Search .................... 463/17, 463/18, 20, 32
See application file for complete search history.

(56) References Cited

U.S. PATENT DOCUMENTS

| | | | | |
|---|---|---|---|---|
| 4,306,768 | A | 12/1981 | Egging | 350/174 |
| 4,454,670 | A | 6/1984 | Bachmann et al. | 194/350 |
| 4,517,558 | A | 5/1985 | Davids | 340/700 |
| 4,562,433 | A | 12/1985 | Biferno | 340/716 |
| 4,568,928 | A | 2/1986 | Biferno | 340/716 |
| 4,718,672 | A | 1/1988 | Okada | 273/143 R |
| 5,283,560 | A | 2/1994 | Bartlett | 345/113 |
| 5,351,966 | A | 10/1994 | Tohyama et al. | 273/311 |
| 5,393,061 | A | 2/1995 | Manship et al. | 273/143 R |
| 5,580,055 | A | 12/1996 | Hagiwara | 273/143 R |
| 5,697,843 | A | 12/1997 | Manship et al. | 463/20 |
| 5,722,891 | A | 3/1998 | Inoue | 463/20 |
| 5,725,210 | A | 3/1998 | Yamaguchi et al. | 273/121 |
| 5,752,881 | A | 5/1998 | Inoue | 273/143 R |
| 5,810,665 | A | 9/1998 | Takemoto et al. | 463/31 |
| 5,890,962 | A | 4/1999 | Takemoto | 463/20 |
| 5,980,384 | A | 11/1999 | Barrie | 463/16 |
| 6,027,115 | A | 2/2000 | Griswold et al. | 273/143 R |
| 6,036,188 | A | 3/2000 | Gomez et al. | 273/118 R |
| 6,038,188 | A | 3/2000 | Akamatsu | 365/226 |
| 6,056,642 | A | 5/2000 | Bennett | 463/20 |
| 6,086,066 | A | 7/2000 | Takeuchi et al. | 273/143 R |

(Continued)

FOREIGN PATENT DOCUMENTS

EP 0 060 019 A1 9/1982

(Continued)

OTHER PUBLICATIONS

"Bigfoot" Product Sheet, Shuffle Master, Inc., 1 page (2000).

(Continued)

*Primary Examiner* — Pierre Eddy Elisca
*Assistant Examiner* — Shahid Kamal
(74) *Attorney, Agent, or Firm* — Nixon Peabody LLP

(57) ABSTRACT

To provide a gaming machine which can carry out a lizhi effect rich in impact without giving a feeling of boredom.
A gaming machine being provided with a display device, which can display an image and can be switched to a transmissive condition or a non-transmissive condition, in front of a plurality of symbols which can be variably displayed, in the event that a combination of the plurality of symbols reaches a lizhi, as well as portions in front of the plurality of symbols taking on the non-transmissive condition, a symbol image corresponding to a last stop displayed symbol is variably displayed on the display device.

23 Claims, 20 Drawing Sheets

U.S. PATENT DOCUMENTS

| | | | | |
|---|---|---|---|---|
| 6,089,977 | A | 7/2000 | Bennett | 463/20 |
| 6,095,921 | A | 8/2000 | Walker et al. | 463/20 |
| 6,110,043 | A * | 8/2000 | Olsen | 463/27 |
| 6,135,884 | A * | 10/2000 | Hedrick et al. | 463/20 |
| 6,135,885 | A | 10/2000 | Lermusiaux | 463/20 |
| 6,164,645 | A | 12/2000 | Weiss | 273/138.2 |
| 6,181,301 | B1 | 1/2001 | Inoguchi et al. | 345/5 |
| 6,190,255 | B1 | 2/2001 | Thomas et al. | 463/20 |
| 6,193,606 | B1 | 2/2001 | Walker et al. | 463/20 |
| 6,224,482 | B1 | 5/2001 | Bennett | 463/20 |
| 6,251,013 | B1 | 6/2001 | Bennett | 463/13 |
| 6,261,177 | B1 | 7/2001 | Bennett | 463/16 |
| 6,270,411 | B1 | 8/2001 | Gura et al. | 463/20 |
| 6,290,600 | B1 | 9/2001 | Glasson | 463/20 |
| 6,317,128 | B1 | 11/2001 | Harrison et al. | 345/629 |
| 6,364,766 | B1 | 4/2002 | Anderson et al. | 463/16 |
| 6,368,216 | B1 | 4/2002 | Hedrick et al. | 463/20 |
| 6,375,568 | B1 | 4/2002 | Roffman et al. | 463/26 |
| 6,419,579 | B1 | 7/2002 | Bennett | 463/20 |
| 6,517,432 | B1 | 2/2003 | Jaffe | 463/16 |
| 6,517,433 | B2 | 2/2003 | Loose et al. | 463/20 |
| 6,817,946 | B2 | 11/2004 | Motegi et al. | 463/31 |
| 6,923,721 | B2 | 8/2005 | Luciano et al. | 463/24 |
| 6,937,298 | B2 | 8/2005 | Okada | 349/58 |
| 7,097,560 | B2 | 8/2006 | Okada | 463/20 |
| 7,140,963 | B2 | 11/2006 | Kojima | 463/20 |
| 7,159,865 | B2 | 1/2007 | Okada | 273/143 |
| 7,160,187 | B2 | 1/2007 | Loose et al. | 463/20 |
| 7,166,029 | B2 | 1/2007 | Enzminger | 463/20 |
| 7,204,753 | B2 | 4/2007 | Ozaki et al. | 463/16 |
| 7,255,643 | B2 | 8/2007 | Ozaki et al. | 463/20 |
| 7,322,884 | B2 * | 1/2008 | Emori et al. | 463/16 |
| 7,458,890 | B2 | 12/2008 | Loose et al. | 463/16 |
| 7,488,252 | B2 * | 2/2009 | Griswold et al. | 463/31 |
| 7,510,475 | B2 | 3/2009 | Loose et al. | 463/31 |
| 7,572,186 | B2 * | 8/2009 | LeMay et al. | 463/32 |
| 7,585,220 | B2 | 9/2009 | Loose et al. | 463/20 |
| 7,730,413 | B1 | 6/2010 | Engel et al. | 715/764 |
| 2001/0000636 | A1 | 5/2001 | Weiss | 273/138.2 |
| 2001/0031658 | A1 | 10/2001 | Ozaki et al. | 463/16 |
| 2002/0175466 | A1 | 11/2002 | Loose et al. | 273/143 |
| 2003/0060269 | A1 | 3/2003 | Paulsen et al. | 463/20 |
| 2003/0087690 | A1 | 5/2003 | Loose et al. | 463/20 |
| 2003/0157980 | A1 | 8/2003 | Loose et al. | 463/20 |
| 2003/0234489 | A1 | 12/2003 | Okada | 273/236 |
| 2003/0236118 | A1 | 12/2003 | Okada | 463/20 |
| 2004/0014520 | A1 | 1/2004 | Okada | 463/20 |
| 2004/0029636 | A1 | 2/2004 | Wells | 463/32 |
| 2004/0063490 | A1 | 4/2004 | Okada | 463/20 |
| 2004/0116178 | A1 | 6/2004 | Okada | 463/20 |
| 2004/0147303 | A1 | 7/2004 | Imura et al. | 463/16 |
| 2004/0150162 | A1 | 8/2004 | Okada | 273/292 |
| 2004/0152502 | A1 | 8/2004 | Okada | 463/16 |
| 2004/0166925 | A1 | 8/2004 | Emori et al. | 463/20 |
| 2004/0166926 | A1 | 8/2004 | Adachi et al. | 463/20 |
| 2004/0171418 | A1 | 9/2004 | Okada | 463/20 |
| 2004/0198485 | A1 | 10/2004 | Loose et al. | 463/20 |
| 2004/0207154 | A1 | 10/2004 | Okada | 273/138.1 |
| 2004/0209666 | A1 | 10/2004 | Tashiro et al. | 463/20 |
| 2004/0209667 | A1 | 10/2004 | Emori et al. | 463/20 |
| 2004/0209668 | A1 | 10/2004 | Okada | 463/20 |
| 2004/0209670 | A1 | 10/2004 | Adachi et al. | 463/20 |
| 2004/0209671 | A1 | 10/2004 | Okada | 463/20 |
| 2004/0209672 | A1 | 10/2004 | Okada | 463/20 |
| 2004/0209678 | A1 | 10/2004 | Okada | 463/30 |
| 2004/0209681 | A1 | 10/2004 | Emori et al. | 463/31 |
| 2004/0209682 | A1 | 10/2004 | Okada | 463/31 |
| 2004/0214635 | A1 | 10/2004 | Okada | 463/30 |
| 2004/0214637 | A1 | 10/2004 | Nonaka | 463/31 |
| 2004/0219965 | A1 | 11/2004 | Okada | 463/16 |
| 2004/0224747 | A1 | 11/2004 | Okada | 463/16 |
| 2004/0224758 | A1 | 11/2004 | Okada et al. | 463/31 |
| 2004/0227286 | A1 | 11/2004 | Tanimura et al. | 273/143 |
| 2004/0227866 | A1 | 11/2004 | Okada | 349/58 |
| 2004/0229680 | A1 | 11/2004 | Hoshino et al. | 463/20 |
| 2004/0229686 | A1 | 11/2004 | Tanimura et al. | 463/30 |
| 2004/0266510 | A1 | 12/2004 | Kojima | 463/16 |
| 2004/0266515 | A1 | 12/2004 | Gauselmann | 463/20 |
| 2004/0266521 | A1 | 12/2004 | Kojima | 463/20 |
| 2005/0032571 | A1 | 2/2005 | Asonuma | 463/20 |
| 2005/0140088 | A1 | 6/2005 | Randall | 273/143 |
| 2005/0153775 | A1 | 7/2005 | Griswold et al. | 463/30 |
| 2005/0187003 | A1 | 8/2005 | Adachi et al. | 463/16 |
| 2005/0192090 | A1 | 9/2005 | Muir et al. | 463/30 |
| 2005/0255908 | A1 | 11/2005 | Wells | 463/20 |
| 2005/0272500 | A1 | 12/2005 | Tanimura et al. | 463/20 |
| 2005/0282616 | A1 | 12/2005 | Tanimura et al. | 463/20 |
| 2005/0282617 | A1 | 12/2005 | Sekiguchi et al. | 463/20 |
| 2006/0014580 | A1 | 1/2006 | Hawthorn | 463/20 |
| 2006/0128467 | A1 | 6/2006 | Thomas | 463/31 |
| 2006/0135248 | A1 | 6/2006 | Anderson et al. | 463/22 |
| 2006/0252496 | A1 | 11/2006 | Rasmussen | 463/20 |
| 2006/0281530 | A1 | 12/2006 | Seelig et al. | 463/20 |
| 2007/0004513 | A1 | 1/2007 | Wells et al. | 463/31 |
| 2007/0054730 | A1 | 3/2007 | Mattice et al. | 463/16 |
| 2007/0149281 | A1 | 6/2007 | Gadda et al. | 463/34 |
| 2009/0131148 | A1 | 5/2009 | Loose et al. | 463/20 |
| 2009/0181758 | A1 | 7/2009 | Loose et al. | 463/20 |

FOREIGN PATENT DOCUMENTS

| | | | |
|---|---|---|---|
| EP | 0 789 338 | A1 | 8/1997 |
| GB | 2 124 505 | A | 2/1984 |
| GB | 2 165 074 | A | 4/1986 |
| GB | 2 253 299 | A | 9/1992 |
| GB | 2 349 494 | A | 11/2000 |
| JP | 61 279272 | | 12/1986 |
| JP | 02 019182 | | 1/1990 |
| JP | 04 109977 | | 4/1992 |
| JP | 04 114676 | | 4/1992 |
| JP | 04 341288 | | 11/1992 |
| JP | 05 177043 | | 7/1993 |
| JP | 06 039085 | | 2/1994 |
| JP | 07 016340 | | 1/1995 |
| JP | 60 061079 | | 4/1995 |
| JP | 07 124290 | | 5/1995 |
| JP | 07 299189 | | 11/1995 |
| JP | 08 103541 | | 4/1996 |
| JP | 2531253 | | 1/1997 |
| JP | 09 207625 | | 8/1997 |
| JP | 10 071228 | | 3/1998 |
| JP | 10 091076 | | 4/1998 |
| JP | 10 305130 | | 11/1998 |
| JP | 10 328398 | | 11/1998 |
| JP | 11 090017 | | 4/1999 |
| JP | 11 099240 | | 4/1999 |
| JP | 11 137774 | | 5/1999 |
| JP | 11 152970 | | 6/1999 |
| JP | 11-153970 | | 6/1999 |
| JP | 11-244451 | | 9/1999 |
| JP | 2000-51314 | | 2/2000 |
| JP | 2000-65097 | | 3/2000 |
| JP | 2000-68925 | | 3/2000 |
| JP | 2000-262738 | | 9/2000 |
| JP | 2000-350805 | | 12/2000 |
| JP | 2001-062032 | | 3/2001 |
| JP | 2002-113150 | | 4/2002 |
| JP | 2005-052449 | A | 3/2005 |
| WO | WO 99/53454 | A1 | 10/1999 |
| WO | WO 99/64997 | A1 | 12/1999 |
| WO | WO 00/32286 | A1 | 6/2000 |
| WO | WO 2006/036948 | A2 | 4/2006 |
| WO | WO 2006/124976 | A1 | 11/2006 |
| WO | WO 2007/011717 | A2 | 1/2007 |

OTHER PUBLICATIONS

"Big Games Safari" Product Sheet, IGT, 24 pages (2000).
"Cabby Cash™" Product Sheet, Anchor Gaming, 2 pages (2000).
"Congo Quest™" Product Sheet, Anchor Gaming, 2 pages (2000).
"Fishin' Buddies™" Product Sheet, Anchor Gaming, 2 pages (2000).
Legato, Frank, "The Full Monty," Strictly Slots, pp. 48-50 (Jun. 1999).
"Gooooaal!" Product Sheet, Bally Gaming, Inc., 2 pages (2000).
"Great Whites" Product Sheet, VLC, Inc., 2 pages (2000).
"Jackpot Stampede Deluxe™" Product Sheet, WMS Gaming Inc., 2 pages (1997).
"Loaded Dice" Product Sheet, Konami Gaming, 2 pages (2000).

"Neptune's Pearls" Product Sheet, Unidesa Gaming, 4 pages (1998).
"Penguin Pays" Product Sheet, Aristocrat Incorporated, 2 pages (1998).
"Stroke Of Luck™" Product Sheet, WMS Gaming Inc., 2 pages (1997).
"Wild Cougar" Article, Strictly Slots, p. 44 (Feb. 1999).
"Yahtzee® Brand Video Game" Product Brochure, Hasbro, Inc., 2 pages (2000).
Decision of Refusal of Aug. 30, 2005, issued from Japanese Patent Office for the corresponding Japanese application No. 2000-051314.
Defendant Bally Gaming Inc.'s Answer, Affirmative Defenses, and Counterclaims to Complaint for Patent Infringement; dated Nov. 9, 2010; Civil Action No. 1:10-CV06679; pp. 1-29.
Complaint for Patent Infringement; dated Oct. 16, 2010; pp. 1-64.

* cited by examiner

Fig. 2

| | LEFT REEL | CENTRAL REEL | RIGHT REEL |
|---|---|---|---|
| CODE NUMBER | SYMBOL | SYMBOL | SYMBOL |
| 00 | JACKPOT 7 | JACKPOT 7 | JACKPOT 7 |
| 01 | PLUM | BELL | CHERRY |
| 02 | ORANGE | APPLE | ORANGE |
| 03 | PLUM | BELL | APPLE |
| 04 | ORANGE | CHERRY | ORANGE |
| 05 | PLUM | ORANGE | PLUM |
| 06 | ORANGE | PLUM | ORANGE |
| 07 | PLUM | CHERRY | PLUM |
| 08 | BLUE 7 | BELL | ORANGE |
| 09 | CHERRY | APPLE | PLUM |
| 10 | ORANGE | BELL | ORANGE |
| 11 | BELL | STRAWBERRY | PLUM |
| 12 | ORANGE | PLUM | BELL |
| 13 | STRAWBERRY | BLUE 7 | STRAWBERRY |
| 14 | BLUE 7 | BELL | BLUE 7 |
| 15 | ORANGE | APPLE | BELL |
| 16 | APPLE | BELL | CHERRY |
| 17 | PLUM | STRAWBERRY | PLUM |
| 18 | ORANGE | PLUM | ORANGE |
| 19 | PLUM | CHERRY | PLUM |
| 20 | BLUE 7 | BELL | ORANGE |
| 21 | CHERRY | APPLE | PLUM |

Fig. 3

| WINNING COMBINATION | | | ESTABLISHMENT POSSIBILITY (%) | PAYOUT QUANTITY (※1) |
|---|---|---|---|---|
| BONUS GAME TRIGGER | | | 0.5 | (※2) |
| JACKPOT 7 | JACKPOT 7 | JACKPOT 7 | 0.5 | 30 |
| BLUE 7 | BLUE 7 | BLUE 7 | 0.8 | 10 |
| BELL | BELL | BELL | 1.1 | 8 |
| CHERRY | CHERRY | CHERRY | 1.5 | 5 |
| STRAWBERRY | STRAWBERRY | ATRAWBERRY | 1.5 | 5 |
| PLUM | PLUM | PLUM | 1.8 | 4 |
| ORANGE | ORANGE | ORANGE | 2.3 | 3 |
| CHERRY | CHERRY | (ANY) | 3.0 | 2 |
| ORANGE | ORANGE | (ANY) | 3.0 | 2 |
| CHERRY | (ANY) | (ANY) | 7.5 | 1 |
| ORANGE | (ANY) | (ANY) | 7.5 | 1 |

※1 COIN PAYOUT QUANTITY PER COIN INSERTED
※2 CARRY OUT FREE GAMES BY THE NUMBER FIXED BY SELECTION

F i g. 7A

| LIZHI EFFECT TABLE (FOR WHEN SETTING LOSING LIZHI FLAG) | | | |
|---|---|---|---|
| APPEARANCE RATIO | EFFECT | NON-TRANSMISSION DISPLAY | PERIOD |
| 64/128 | NORMAL LIZHI | NO | SHORT |
| 32/128 | TELESCOPE LIZHI (FAILURE) | YES | LONG |
| 32/128 | BIRD LIZHI (FAILURE) | YES | LONG |

F i g. 7B

| LIZHI EFFECT TABLE (FOR WHEN SETTING BONUS LIZHI FLAG) | | | |
|---|---|---|---|
| APPEARANCE RATIO | EFFECT | NON-TRANSMISSION DISPLAY | PERIOD |
| 8/128 | NORMAL LIZHI | NO | SHORT |
| 50/128 | TELESCOPE LIZHI (SUCCESS) | YES | LONG |
| 10/128 | TELESCOPE LIZHI (COMEBACK) | YES | LONG |
| 50/128 | BIRD LIZHI (SUCCESS) | YES | LONG |
| 10/128 | BIRD LIZHI (COMEBACK) | YES | LONG |

GAMING MACHINE AND GAME CONTROL METHOD

RELATED APPLICATION

This application claims the priority of Japanese Patent Application No. 2006-190852 filed on Jul. 11, 2006, which is incorporated herein by reference.

BACKGROUND OF THE INVENTION

1. Technical Field

The present invention relates to a gaming machine which carries out a game using a token such as a coin, and a game control method according to the gaming machine.

2. Related Art

A slot machine, in which reels, on a peripheral surface of each of which is depicted a symbol column with a plurality of symbols, are rotated and then stopped, and a game result is determined according to a combination of symbols displayed, that is, a slot machine equipped with mechanical reels is divided roughly into a so-called pachi-slot machine and a so-called casino machine. The pachi-slot machine and the casino machine differ in whether or not an operation of stopping the rotation of the reels is needed. That is, the pachi-slot machine including a number of stop buttons equal to that of the reels, the rotation of the reels stops in accordance with a player's depression operation of the stop buttons. Meanwhile, the casino machine, including no stop button, is configured in such a way that each reel stops automatically in a prescribed order.

To date, the pachi-slot machine and the casino machine each being provided with a liquid crystal display device or the like, in accordance with the rotation, stopping or the like of the reels, a variety of effects due to an image is carried out on the liquid crystal display device or the like.

In recent years, in the pachi-slot machine, the fact has prevailed that, a transparent liquid crystal panel being installed in front of the reels, an image is displayed in front of the reels. As this kind of pachi-slot machine, for example, a pachi-slot machine exists in which, in a case in which each reel is stop displayed in a transparent display area of the transparent liquid crystal panel, by determining a display priority among a plurality of image elements, such as spotlights (a partial transmissive condition) or rocks, based on a stop display mode of the reels, it is possible to carry out an effect display in multifarious ways (for example, refer to Japanese Unexamined Patent Publication No. 2005-52449).

In the pachi-slot machine described in Japanese Unexamined Patent Publication No. 2005-52449, in a case in which an effect carried out in a condition in which one symbol is missing from a prescribed combination (a so-called lizhi effect) is carried out, for example, when a bonus symbol "red 7" is stop displayed in each of two of three reels, and a lizhi occurs, the display priority of the spotlights being made higher than that of the image representing the rocks, the lizhi effect by the reels is preferentially carried out.

SUMMARY OF THE INVENTION

The invention has an object of providing a gaming machine which can carry out a lizhi effect rich in impact without giving a feeling of boredom, and a game control method.

In order to achieve the heretofore described object, the invention provides the following.

A gaming machine of the invention includes: a first display device which displays a plurality of symbols which can be variably displayed and stop displayed; a second display device which, being provided in front of the first display device, can display an image and can be switched to a transmissive condition or a non-transmissive condition; and a controller which controls the first and second display devices, the controller, in a case in which a combination of the plurality of symbols reaches a condition in which it lacks one symbol of a prescribed combination, by controlling the second display device, as well as putting portions in front of the plurality of symbols into the non-transmissive condition, variably displaying a symbol image corresponding to a last stop displayed symbol on the second display device.

According to the heretofore described configuration, in a case of the heretofore described condition (the condition in which one symbol is missing from the prescribed combination) the second display device takes on the non-transmissive condition and, as well as symbols other than the last stop displayed symbol taking on an invisible condition, the symbol image corresponding to the last stop displayed symbol is variably displayed on the second display device, so it is not necessary to wait aimlessly until the symbol other than the last stop displayed symbol stops. Consequently, it being possible to increase the player's hope for and joy at a winning combination at a point at which an effect carried out in the condition in which the combination of the plurality of symbols lacks one symbol of the prescribed combination, that is, a lizhi effect, is carried out, it is possible as a result to make the lizhi effect rich in impact for the player.

In the invention, the "transmissive condition" refers to a condition in which a symbol is visible or easy to visually perceive from a front, and the "non-transmissive condition" refers to a condition in which the symbol is invisible or difficult to visually perceive from the front. That is, it being sufficient that a difference in symbol visibility occurs between the transmissive condition and the non-transmissive condition, the non-transmissive condition does not refer to a condition in which the symbol is literally invisible. Also, in the invention, "invisible", being a concept including a condition of being invisible and a condition of being difficult to visually perceive, does not refer to a literally invisible condition. Also, although the symbol image is stop displayed showing the same symbol as the last stop displayed symbol, it not always being necessary that the varying display of the symbol image is synchronized with the varying display of the symbol, it is acceptable that the symbol image is either variably displayed in a different pattern from a varying display pattern of the symbol, or variably displayed at a different rate from a varying display rate of the symbol. Also, the condition in which the combination of the plurality of symbols lacks one symbol of the prescribed combination will be referred to hereafter as a "lizhi".

In the gaming machine of the invention, it is possible to employ a configuration in which a varying display period of the symbol image is longer than a varying display period of the last stop displayed symbol in a case in which the symbol image is not displayed.

In the gaming machine of the invention, it is possible to employ a configuration in which, in the case in which the combination of the plurality of symbols reaches the heretofore described condition (the so-called "lizhi", which is the condition in which one symbol is missing from the prescribed combination), on condition that the image displayed on the second display device is a specified image, as well as the portions in front of the plurality of symbols reaching the non-transmissive condition, the symbol image corresponding to the last stop displayed symbol is variably displayed on the second display device.

In the gaming machine of the invention, it is possible to employ a configuration in which, immediately after the varying display of the plurality of symbols is started, as well as the portions in front of the plurality of symbols taking on the non-transmissive condition, the symbol image corresponding to the last stop displayed symbol is variably displayed on the second display device. As used herein, "immediately after" refers, at least, to a period from the varying display of the symbols being started until a stop display of one symbol is carried out but, preferably, is substantially the same point as a point at which the varying display of the symbols is started.

In the gaming machine of the invention, it is possible to employ a configuration in which, in a case in which the combination of the plurality of symbols becomes a combination corresponding to a bonus game which is a gaming mode advantageous to a player, as well as the portions in front of the plurality of symbols taking on the non-transmissive condition, the symbol image corresponding to the last stop displayed symbol is variably displayed on the second display device.

According to the invention, in the condition in which the combination of the plurality of symbols lacks one symbol of the prescribed combination (the lizhi condition), it is possible to carry out the effect rich in impact without giving the feeling of boredom.

Additional objects and advantage of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE INVENTION OF THE DRAWINGS

The accompanying drawings, which are incorporated in and constitute apart of the specification, illustrate embodiments of the invention, and together with the general description given above and the detailed description of the embodiments given below, serve to explain the principals of the invention.

FIG. 2 is a schematic diagram showing an example of a column of symbols depicted on an outer peripheral surface of each reel;

FIG. 3 is a diagram for illustrating a correlation between a plurality of kinds of winning combination and an establishment possibility of, and a payout quantity for, each winning combination;

FIGS. 7A and 7B are diagrams each showing an example of a lizhi effect table;

DESCRIPTION OF THE PREFERRED EMBODIMENTS

In the following detailed description, a description will be given, centered on characteristic portions, in such a way as to enable an easier understanding of the invention. The invention, not being limited to an embodiment described in the following detailed description, can also be applied to other embodiments, and its range of application is diverse. Also, the terminology and phraseology used in this specification are used to accurately describe the invention, and not used to limit the interpretation of the invention. Also, it is deemed easy for those skilled in the art to deduce, from the concept of the invention described in this specification, another configuration, system, method or the like included in the concept of the invention. Consequently, the description of the claims has to be considered to include a uniform configuration without departing from the scope of the technical idea of the invention. Also, the aim of the abstract is to allow the patent office and general public institutions, or engineers or the like who, belonging to the art, are not skilled in patent, legal or technical terms, to immediately judge technical contents of the invention and its essence from a simple investigation. Consequently, the abstract is not intended to limit the scope of the invention which should be evaluated from the description of the claims. Also, in order to fully understand the object of the invention and the unique advantages of the invention, it is desirable to interpret them by making full allowance for an already disclosed document or the like.

The following detailed description includes processes executed by a computer. The following description and expressions are given for the purpose of the most efficient understanding of those skilled in the art. In this specification, each step used to derive one result should be understood as a self-consistent process. Also, in each step, a transmission and reception, a recording or the like of an electric or magnetic signal is carried out. In the process of each step, although this kind of signal is expressed in a form of a bit, a value, a symbol, a letter, a term, a number or the like, it is necessary to keep in mind that they are used merely for convenience of explanation. Also, although the processes of each step are sometimes described using terms common to those of human behavior, the processes described in this specification are executed by each kind of device in principle. Also, other configurations required to carry out each step will be obvious from the following description.

Figure 1:
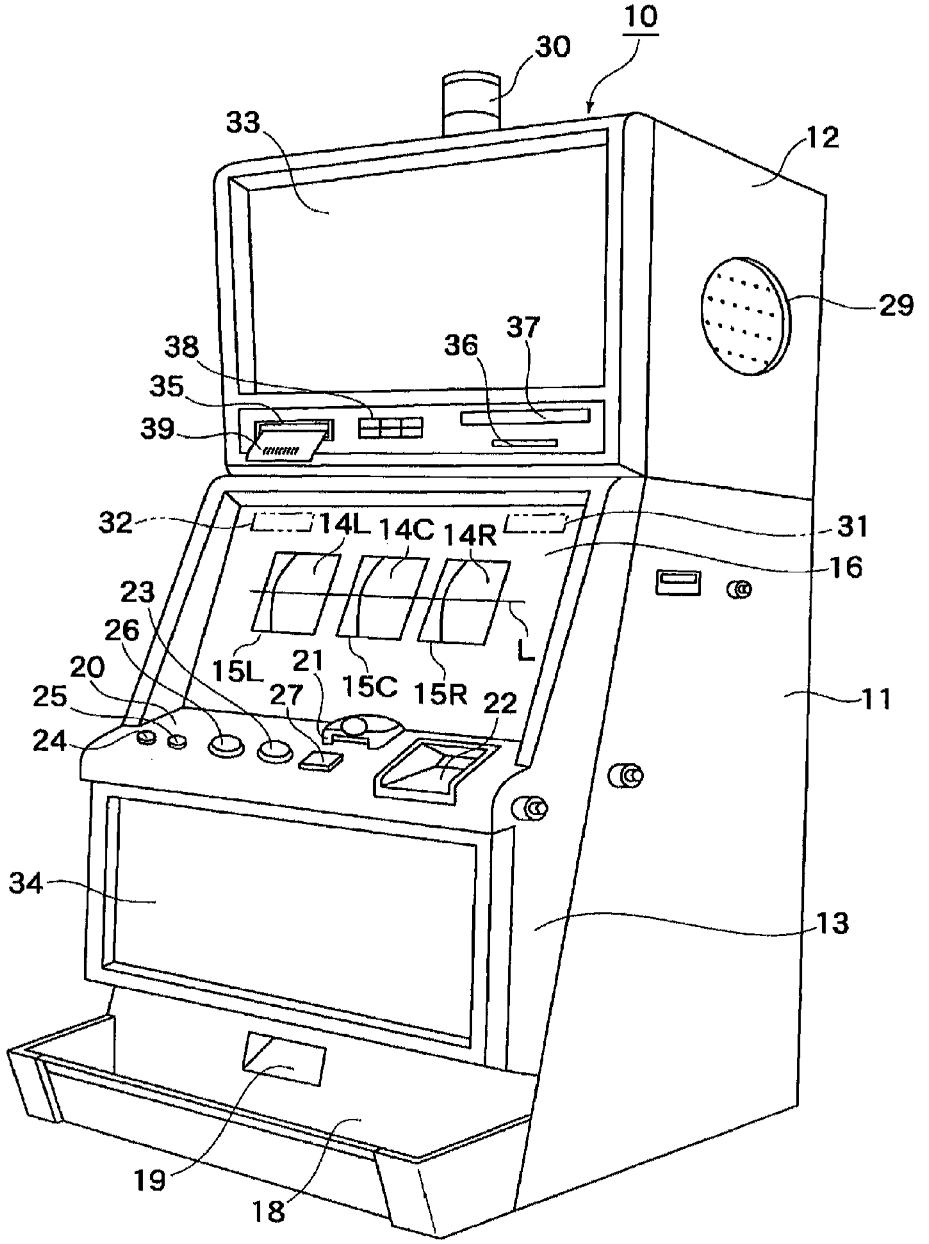
FIG. 1 is a perspective view schematically showing a gaming machine according to an embodiment of the invention.

FIG. 1 is a perspective view schematically showing a gaming machine according to an embodiment of the invention.

In this embodiment, a gaming machine 10 is a slot machine. However, in the invention, the gaming machine not being limited to the slot machine, it is also acceptable that it is, for example, a so-called single game machine, such as a video slot machine or a video card game machine, or a so-called mass game machine (a multi-terminal gaming machine) or the like which carries out a game, such as a horse racing game, a bingo game or a lottery, which requires a prescribed time until a result is displayed.

In the gaming machine 10, a coin, a bill or electronic valuable information equivalent to them is used as a game medium. However, in the invention, the game medium can include, but is not particularly limited to, for example, a medal, a token, electronic money and a ticket. The ticket can include, but is not particularly limited to, for example, a bar-coded ticket, such as to be described hereafter, and the like.

The gaming machine 10 includes a cabinet 11, a top box 12 disposed on top of the cabinet 11, and a main door 13 provided on a front of the cabinet 11. Three reels 14 (14L, 14C and 14R) are rotatably provided inside the cabinet 11. These reels 14 correspond to a first display device. A symbol column with 22 symbols is depicted on an outer peripheral surface of each reel 14.

A lower image display panel 16 is provided in front of the reels 14 in the main door 13. The lower image display panel 16 including a transparent liquid crystal panel and a liquid crystal shutter disposed on a back thereof, during a game, various information relating to the game, an effect image and the like are displayed on the transparent liquid crystal panel. The lower image display panel 16 corresponds to a second display device. A credit quantity display portion 31 and a payout quantity display portion 32 are set in the lower image display panel 16. A number of coins credited is displayed in the credit quantity display portion 31 by means of an image. A number of coins to be paid out in the event that a combination of symbols stop displayed on a win line L is a prescribed combination is displayed in the payout quantity display portion 32 by means of an image.

Three display windows 15 (15L, 15C and 15R), being formed in the lower image display panel 16 in such a way as to make its rear face visible, three of the symbols depicted on the outer peripheral surface of each reel 14 are displayed via each display window 15. The display windows 15 can be switched to a transmissive condition or a non-transmissive condition by means of the liquid crystal shutter. The switching to the transmissive condition or the non-transmissive condition can be carried out individually for each of the display windows 15L, 15C and 15R. Also, it not always being necessary that the switching to the transmissive condition and the non-transmissive condition is carried out in an instant, it is also possible, for example, by gradually increasing a non-transmissive area in a case in which the display window 15L is in the transmissive condition, to take time to switch the display windows 15 from the transmissive condition to the non-transmissive condition. As this kind of liquid crystal shutter, being described in, for example, Japanese Unexamined Patent Publication Nos. 2004-8705, 2004-73651 and the like, is publicly known, a description will be omitted here. One win line L passing horizontally through the three display windows 15 is formed on the lower image display panel 16. The win line L regulates a combination of symbols. In the event that a combination of symbols stop displayed on the win line L is the prescribed combination, a number of coins corresponding to the combination and a number of coins inserted (a BET quantity) is paid out.

Furthermore, a touch sensitive screen 69, not shown, being provided on a front surface of the lower image display panel 16, it is possible for a player to input various instructions by operating the touch sensitive screen 69.

A control panel 20 having a plurality of buttons 23 to 27 with which instructions relating to a game implementation are input by the player, a coin acceptor 21 which accepts coins into the cabinet 11, and a bill validator 22 are provided below the lower image display panel 16.

The control panel 20 is provided with a SPIN button 23, a CHANGE button 24, a CASHOUT button 25, a 1-BET button 26 and a MAX BET button 27. The SPIN button 23 is for inputting an instruction to start a rotation of the reels 14. The CHANGE button 24 is used to request a change of money from an attendant of a game establishment. The CASHOUT button 25 is for inputting an instruction to pay out credited coins into a coin tray 18.

The 1-BET button 26 is for inputting an instruction to bet one coin, from among the credited coins, on the game. The MAX BET button 27 is for inputting an instruction to bet a maximum number (in this embodiment, 50) of coins, from among the credited coins, which can be bet on one game.

The bill validator 22, as well as recognizing a legitimacy of a bill, accepts the legitimate bill into the cabinet 11. It is also acceptable that the bill validator 22 is configured in such a way as to be able to read a bar-coded ticket 39 to be described hereafter. A belly glass 34 on which is depicted a character or the like of the gaming machine 10 is provided on a lower front of the main door 13, that is, below the control panel 20.

An upper image display panel 33 is provided on a front of the top box 12. The upper image display panel 33 includes a liquid crystal panel, on which is displayed, for example, an image representing an introduction of game contents or an explanation of game rules.

Also, a speaker 29 is provided on the top box 12. A ticket printer 35, a card reader 36, a data indicator 37 and a keypad 38 are provided below the upper image display panel 33. The ticket printer 35 prints a bar code into which are encoded data, such as a credit quantity, a date and time, and an identification number of the gaming machine 10, on a ticket, and outputs the ticket as the bar-coded ticket 39. The player can cause another gaming machine to read the bar-coded ticket 39 and play a game on the relevant gaming machine, or can change the bar-coded ticket 39 into a bill or the like at a prescribed place of the game establishment (for example, a cashier in a casino).

The card reader 36 carries out a reading of data from a smart card and a writing of the data onto the smart card. The smart card is a card which the player possesses, on which are stored, for example, data for identifying the player and data relating to a history of a game which the player has played. It is also acceptable that data equivalent to the coin, bill or credit are stored on the smart card. Also, it is also acceptable to employ a magnetic stripe card in place of the smart card. The data indicator 37, having a fluorescent display or the like, indicates, for example, data read by the card reader 36 or data input by the player via the keypad 38. The keypad 38 is for inputting instructions or data relating to a ticketing or the like.

FIG. 2 is a schematic diagram showing the column of symbols depicted on the outer peripheral surface of each reel.

22 symbols are depicted on the outer peripheral surface of each of the left reel 14L, the central reel 14C and the right reel 14R. The symbols depicted on the reels 14 differ between one column and another. Each symbol column is configured by combining symbols "JACKPOT 7", "BLUE 7", "BELL", "CHERRY", "STRAWBERRY", "PLUM", "ORANGE" and "APPLE". In the figure, code numbers in a left section are allotted to symbols in a right section. Regarding "JACKPOT 7", "BLUE 7", "BELL", "CHERRY", "STRAWBERRY", "PLUM" and "ORANGE", in the event that three of a kind are stop displayed on the win line L, a predetermined credit quantity is added as a credit owned by the player. Also, regarding "CHERRY" and "ORANGE", even in the event that either of them or two of a kind are stop displayed on the win line L, a predetermined credit quantity is added as the credit owned by the player, in accordance with the number.

"APPLE" is a bonus game trigger (a symbol for allowing a transition to a bonus game). In the event that three "APPLE's" are stop displayed on the win line L, it is possible to make a transition to the bonus game. In this embodiment, the bonus game is a free game (a game which can be played a prescribed number of times without betting any coins).

The columns of the symbols depicted on the reels 14, when a game is started by depressing the SPIN button 23 after depressing the 1-BET button 26 or the MAX BET button 27, are displayed scrolling from a top to a bottom in the display windows 15, in conjunction with a rotation of the reels 14, and, after a prescribed time elapses, are stop displayed in the display windows 15, in conjunction with a stopping of the rotation of the reels 14. Furthermore, various winning combinations being fixed in advance based on symbol combinations, when a symbol combination corresponding to a winning combination is stopped on the win line L, a coin payout quantity corresponding to the winning combination is added to the credit owned by the player. Also, when the bonus game trigger is established, the bonus game occurs.

Herein, a description will be given of the winning combinations in this embodiment.

FIG. 3 is a diagram illustrating a relationship between a plurality of kinds of winning combination and a possibility of establishment of, and a payout quantity for, each winning combination. The possibility of establishment of each winning combination shown in FIG. 3 is for a case in which a payout ratio in other than the bonus game is 88%. The establishment possibility shown in the figure shows a possibility that, in a case in which a code number of each reel 14 has been determined based on three random numbers with reference to symbol weighing data to be described hereafter, the relevant winning combination is established. That is, the establishment possibility is not based on a correlation of a random number with each winning combination.

The possibility of establishment of the bonus game trigger is 0.5%. When the bonus game trigger is won, three "APPLE" symbols are stop displayed on the win line L, and the bonus game occurs. In the bonus game, a number of free games fixed by a selection is executed. The possibility of establishment of "JACKPOT 7" is 0.5%. When this winning combination is established, three "JACKPOT 7" symbols are stop displayed on the win line L, and 30 coins are paid out for each coin inserted. The lower the establishment possibility, the higher the payout quantity set. However, in the event that a symbol combination which forms none of the winning combinations shown in FIG. 3 is stop displayed, it is a loss, and no payout of coins is carried out.

Figure 4:
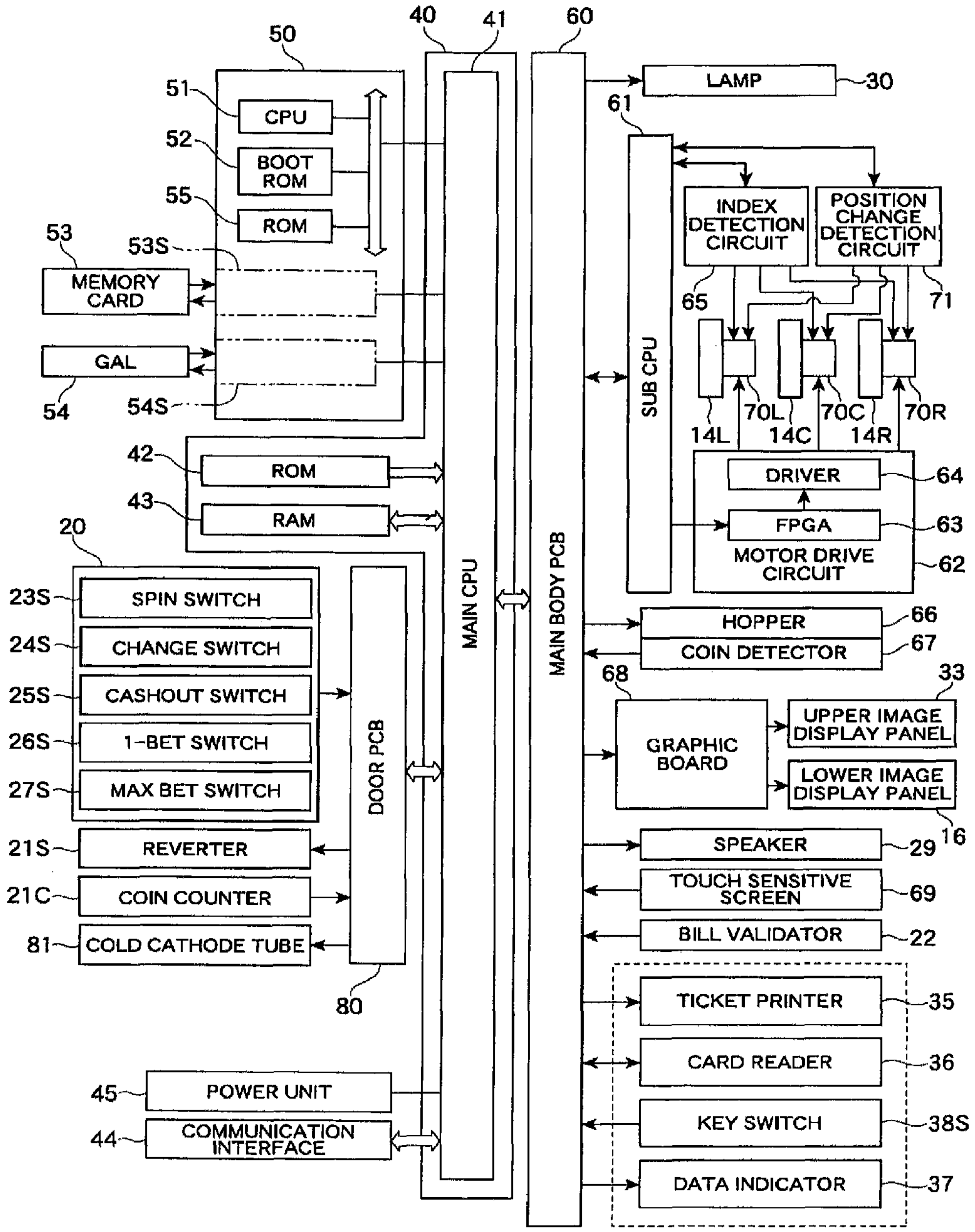
FIG. 4 is a block diagram showing an internal configuration of the gaming machine shown in FIG. 1.

FIG. 4 is a block diagram showing an internal configuration of the gaming machine shown in FIG. 1.

A gaming board 50 includes a CPU (Central Processing Unit) 51, an ROM 55, a boot ROM 52, a card slot 53S compatible with a memory card 53, and an IC socket 54S compatible with a GAL (Generic Array Logic) 54, which are mutually connected via an internal bus.

The memory card 53, including a nonvolatile memory such as Compact Flash®, stores a game program and a game system program. A selection program is included in the game program. The selection program is a program for determining symbols (code numbers corresponding to the symbols) of the reels 14 stop displayed on the win line L. Symbol weighing data corresponding to each of a plurality of kinds of payout ratio (for example, 80%, 84% and 88%) are included in the selection program. The symbol weighing data are data which, regarding each of three reels 14, indicate a correlation between the code number of each symbol (refer to FIG. 2) and one or a plurality of random numbers belonging to a prescribed range of numbers (0 to 255). A payout ratio being fixed based on payout ratio setting data transmitted from the GAL 54, a selection is carried out based on symbol weighing data corresponding to this payout ratio.

Also, the card slot 53S, being configured in such a way that the memory card 53 can be inserted into and removed from it, is connected to a mother board 40 via an IDE bus. Consequently, by removing the memory card 53 from the card slot 53S, writing another game program and game system program into the memory card 53, and inserting the relevant memory card 53 into the card slot 53S, it is possible to change a type and contents of the game carried out on the gaming machine 10. A program relating to a game implementation is included in the game program. Also, image data and sound data transmitted during the game are included in the game program.

The GAL 54 is a kind of PLD having an OR fixed array structure. The GAL 54 including a plurality of input ports and output ports, when prescribed data are input into the input ports, data corresponding to the data are output from the output ports. The data output from the output ports are the heretofore described payout ratio setting data.

Also, the IC socket 54S, being configured in such a way that the GAL 54 can be inserted into and removed from it, is connected to the mother board 40 via a PCI bus. Consequently, by replacing the GAL 54 with another GAL 54, it is also possible to change the payout ratio setting data.

The CPU 51, the ROM 55 and the boot ROM 52, which are mutually connected via the internal bus, are connected to the mother board 40 via a PCI bus.

The mother board 40, being configured by using a general-purpose mother board available on the market (a printed circuit board mounted with basic parts of a personal computer), includes a main CPU 41, an ROM (Read Only Memory) 42, an RAM (Random Access Memory) 43 and a communication interface 44. The main CPU 41 corresponds to a controller.

The ROM 42 includes a memory device such as a flash memory, in which are stored a program, such as a BIOS (Basic Input/Output System), executed by the main CPU 41, and permanent data. When the BIOS is executed by the main CPU 41, as well as a process of initializing a prescribed peripheral device being carried out, a process of downloading the game program and game system program stored in the memory card 53 via a gaming board 50 is started. In the invention, it is also acceptable that the ROM 42 is either capable or incapable of rewriting the contents.

Data and a program used for the main CPU 41 to operate are stored in the RAM 43. Also, the RAM 43 can store the game program. The RAM 43 is a memory in the invention. Furthermore, data such as a credit quantity, and an insertion quantity and a payout quantity in one game, are stored in the RAM 43.

Also, a main body PCB (Printed Circuit Board) 60 and a door PCB 80, to be described hereafter, are each connected to the mother board 40 via a USB. Furthermore, a power unit 45 is connected to the mother board 40.

An instrument or a device, which generates an input signal to be input into the main CPU 41, and an instrument or a device, an operation of which is controlled by a control signal transmitted from the main CPU 41, are connected to the main body PCB 60 and the door PCB 80. The main CPU 41, based on the input signal input into the main CPU 41, by executing the game program stored in the RAM 43, carries out a prescribed calculation process, and stores a result thereof in the RAM 43, or transmits the control signal to each instrument or device as a control process with respect to each instrument or device.

A lamp 30, a sub-CPU 61, a hopper 66, a coin detector 67, a graphic board 68, the speaker 29, the touch sensitive screen 69, the bill validator 22, the ticket printer 35, the card reader 36, a key switch 38S and the data indicator 37 are connected to the main body PCB 60. The lamp 30, based on the control signal transmitted from the main CPU 41, comes on in a prescribed pattern.

The sub-CPU 61 carries out a control of the rotation and stopping of the reels 14 (14L, 14C and 14R). A motor drive circuit 62 including an FPGA (Field Programmable Gate Array) 63 and a driver 64 is connected to the sub-CPU 61. The FPGA 63, being an electronic circuit such as a programmable LSI, functions as a control circuit of stepping motors 70. The driver 64 functions as an amplifier circuit for pulses input into the stepping motors 70. The stepping motors 70 (70L, 70C and 70R) carrying out the rotation of the corresponding reels 14 are connected to the motor drive circuit 62. The stepping motors 70 are 1-2 phase excitation type stepping motors.

Also, an index detection circuit 65 and a position change detection circuit 71 are connected to the sub-CPU 61. The index detection circuit 65 detects a position (an index to be described hereafter) of each rotating reel 14 and, furthermore, can detect a loss of synchronism of each reel 14. The position change detection circuit 71 detects a change of a stop position of each reel 14 after the rotation of each reel 14 stops. The position change detection circuit 71 is configured in such a way that, by detecting, for example, fins (not shown) attached to inner portions of each reel 14 at prescribed intervals, it is possible to detect the change of the stop position of each reel 14.

The hopper 66, being disposed in the cabinet 11, based on the control signal transmitted from the main CPU 41, pays out a prescribed number of coins into the coin tray 18 through a coin payout opening 19. The coin detector 67, being provided inside the coin payout opening 19, in a case of detecting that the prescribed number of coins has been paid out through the coin payout opening 19, transmits an input signal to the main CPU 41.

The graphic board 68, based on the control signal transmitted from the main CPU 41, as well as controlling an image display on the upper image display panel 33 and the lower image display panel 16, carries out a control of switching each display window 15 of the lower image display panel 16 to the transmissive condition or the non-transmissive condition. The credit quantity stored in the RAM 43 is displayed in the credit quantity display portion 31 of the lower image display panel 16. Also, the coin payout quantity is displayed in the payout quantity display portion 32 of the lower image display panel 16. The graphic board 68 includes a VDP (Video Display Processor), which generates image data based on the control signal transmitted from the main CPU 41, a video RAM, which temporarily stores the image data generated by the VDP, a microcomputer, which carries out a control of the liquid crystal shutter, a drive circuit, and the like. Image data used for the VDP to generate the image data are included in the game program which has been read from the memory card 53 and stored in the RAM 43.

The bill validator 22, as well as recognizing the legitimacy of the bill, accepts the legitimate bill into the cabinet 11. The bill validator 22, when accepting the legitimate bill, transmits an input signal to the main CPU 41, based on a value of the bill. The main CPU 41 stores a credit quantity corresponding to the value of the bill transmitted via the input signal in the RAM 43.

The ticket printer 35, based on the control signal transmitted from the main CPU 41, prints a bar code into which are encoded data stored in the RAM 43, such as the credit quantity, the date and time, and the identification number of the gaming machine 10, on a ticket, and outputs the ticket as the bar-coded ticket 39.

The card reader 36 reads the data from the smart card and transmits them to the main CPU 41 or, based on the control signal from the main CPU 41, carries out the writing of the data onto the smart card. The key switch 38S, being provided on the keypad 38, transmits a prescribed input signal to the main CPU 41 when the keypad 38 is operated by the player.

The data indicator 37, based on the control signal transmitted from the main CPU 41, indicates the data read by the card reader 36 and the data input by the player via the keypad 38.

The control panel 20, a reverter 21S, a coin counter 21C and a cold cathode tube 81 are connected to the door PCB 80. The control panel 20 is provided with a SPIN switch 23S corresponding to the SPIN button 23, a CHANGE switch 24S corresponding to the CHANGE button 24, a CASHOUT switch 25S corresponding to the CASHOUT button 25, a 1-BET switch 26S corresponding to the 1-BET button 26, and a MAX BET switch 27S corresponding to the MAX BET button 27. Each switch 23S to 27S, when the corresponding buttons 23 to 27 are operated by the player, transmits an input signal to the main CPU 41.

The coin counter 21C, being provided inside the coin acceptor 21, recognizes a legitimacy of a coin inserted into the coin acceptor 21 by the player. Coins other than the legitimate coin are ejected from the coin payout opening 19. Also, the coin counter 21C, when detecting the legitimate coin, transmits an input signal to the main CPU 41.

The reverter 21S, operating based on the control signal transmitted from the main CPU 41, sorts coins recognized as the legitimate coins by the coin counter 21C into a cash box (not shown) or the hopper 66, disposed in the gaming machine 10. That is, in the event that the hopper 66 is filled with coins, the legitimate coins are sorted into the cash box by the reverter 21S while, in the event that the hopper 66 is not filled with coins, the legitimate coins are sorted into the hopper 66. The cold cathode tube 81, functioning as a back light disposed on a back of each of the lower image display panel 16 and the upper image display panel 33, comes on based on the control signal transmitted from the main CPU 41.

Next, a description will be given of processes carried out in the gaming machine 10.

The main CPU 41, by reading and executing the game program, implements the game.

Figure 5:
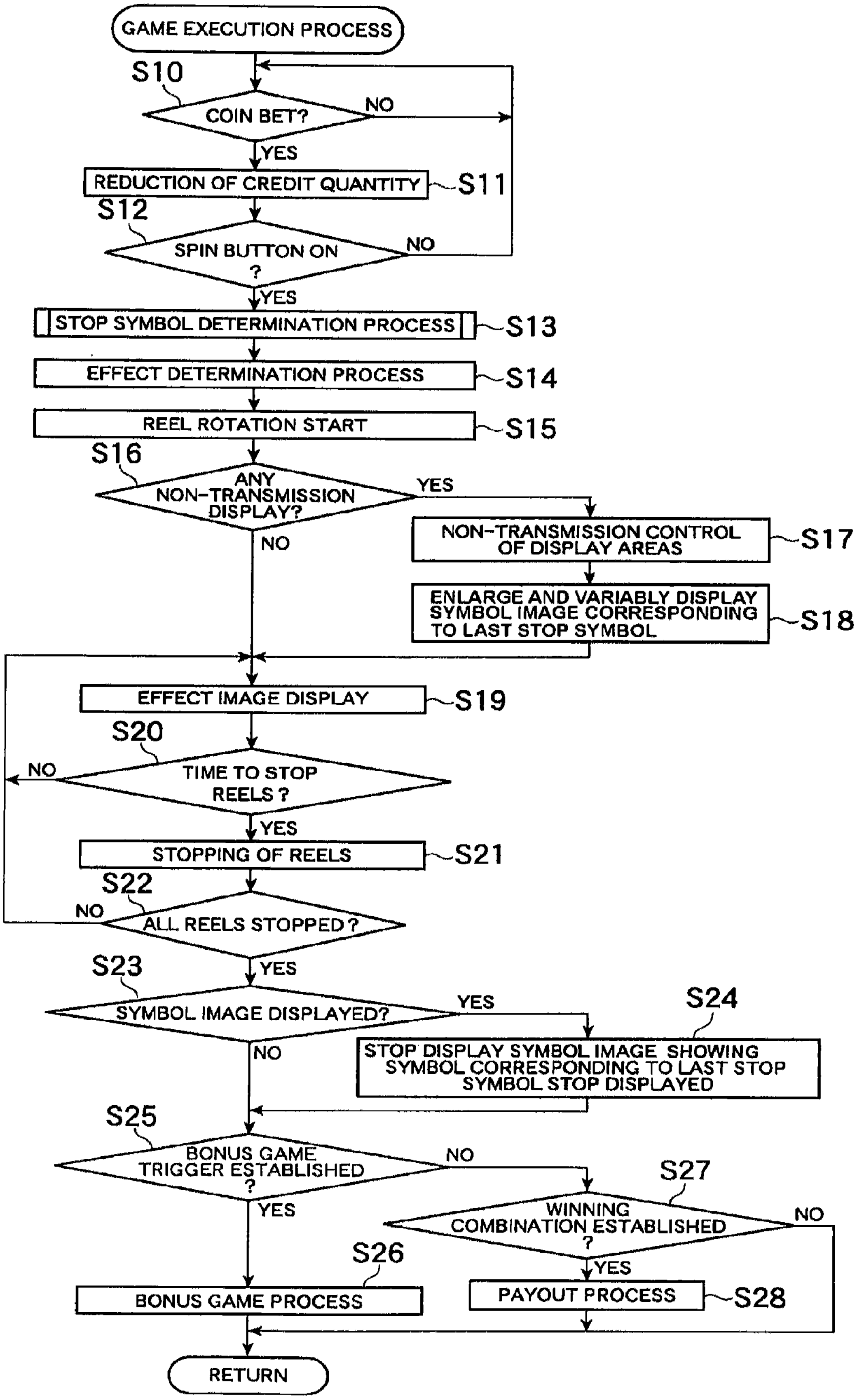
FIG. 5 is a flowchart showing a sub-routine of a game execution process.

FIG. 5 is a flowchart showing a sub-routine of a game execution process.

In the game execution process, first, the main CPU 41 judges whether or not a coin has been bet (step S10). In this process, the main CPU 41 judges whether or not it has received an input signal transmitted from the 1-BET switch 26S when the 1-BET button 26 is operated, or whether or not it has received an input signal transmitted from the MAX BET switch 27S when the MAX BET button 27 is operated. The main CPU 41, if it judges that no coin has been bet, returns the process to step S10.

Meanwhile, the main CPU 41, if it judges in step S10 that coins have been bet, in accordance with a number of the coins bet, carries out a process of reducing the credit quantity stored in the RAM 43 (step S11). If the number of coins bet is larger than the credit quantity stored in the RAM 43, the main CPU 41, without carrying out the process of reducing the credit quantity stored in the RAM 43, returns the process to step S10. Also, if the number of coins bet exceeds an upper limit (in this embodiment, 50) which can be bet on one game, the main CPU 41, without carrying out the process of reducing the credit quantity stored in the RAM 43, advances the process to step S12.

Next, the main CPU 41 judges whether or not the SPIN button 23 has been turned on (step S12). In this process, the main CPU 41 judges whether or not it has received an input signal transmitted from the SPIN switch 23S when the SPIN button 23 has been depressed.

The main CPU 41, if it judges that the SPIN button 23 has not been turned on, returns the process to step S10. If the SPIN button 23 has not been turned on (for example, if an instruction to finish the game has been input without the SPIN button 23 being turned on), the main CPU 41 cancels a reduction result of step S11.

Meanwhile, the main CPU 41, if it judges in step S12 that the SPIN button 23 has been turned on, carries out a stop symbol determination process (step S13).

Herein, a description will be given of the stop symbol determination process.

Figure 6:
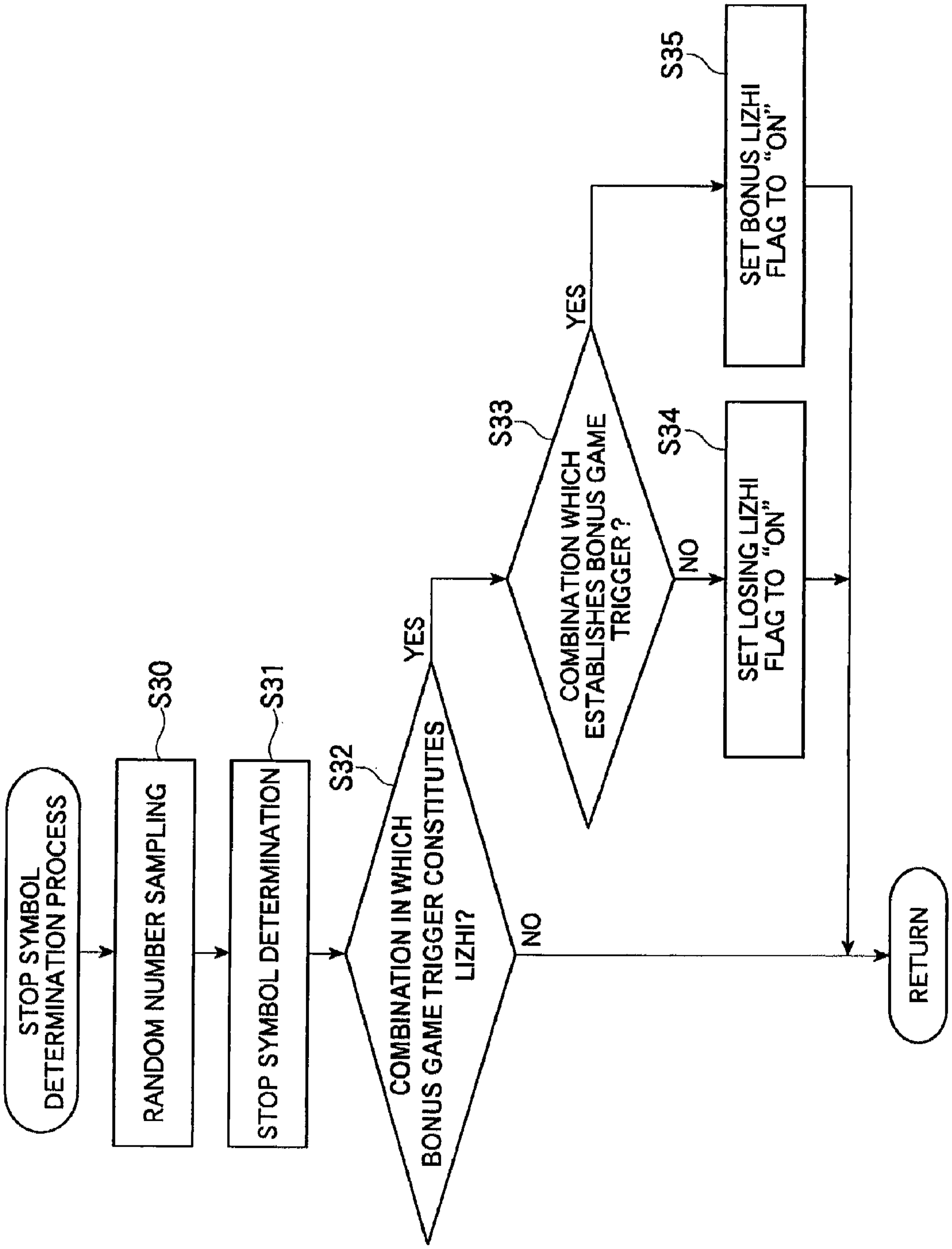
FIG. 6 is a flowchart showing a sub-routine of a stop symbol determination process.

FIG. 6 is a flowchart showing a sub-routine of the stop symbol determination process which is called up and executed in step S13 of the sub-routine shown in FIG. 5. This process is one which is carried out by the main CPU 41 executing the selection program stored in the RAM 43.

First, the main CPU 41, by executing a random number generation program included in the selection program, samples one random number corresponding to each of the three reels 14 from within the range of numbers 0 to 255 (step S30). Next, the main CPU 41, referring to the symbol weighing data corresponding to the payout ratio setting data which have been transmitted from the GAL 54 and stored in the RAM 43, determines code numbers of the reels 14 based on the selected three random numbers (refer to FIG. 2) (step S31). The code numbers of the reels 14 correspond to code numbers of symbols stop displayed on the win line L. The main CPU 41, by determining the code numbers of the reels 14, determines a winning combination (refer to FIG. 3).

Next, the main CPU 41 judges whether or not the determined winning combination is a combination in which the bonus game trigger constitutes the lizhi, that is, a combination which includes two or more bonus game triggers (step S32). The main CPU 41, if it judges that the winning combination is not the combination in which the bonus game trigger constitutes the lizhi, finishes this sub-routine. Meanwhile, the main CPU 41, if it judges that the winning combination is the combination in which the bonus game trigger constitutes the lizhi, judges whether or not the winning combination is a combination which establishes the bonus game trigger, that is, a combination which includes three bonus game triggers (step S33). The main CPU 41, if it judges that the winning combination is not the combination which establishes the bonus game trigger, sets a losing lizhi flag to "ON" in the RAM 43 (step S34), and finishes this sub-routine. Meanwhile, the main CPU 41, if it judges that the winning combination is the combination which establishes the bonus game trigger, sets a bonus lizhi flag to "ON" in RAM 43 (step S35), and finishes this sub-routine. Subsequently, the main CPU 41 advances the process to step S14 of the sub-routine shown in FIG. 5.

Next, the main CPU 41 carries out an effect determination process (step S15)

In this process, the main CPU 41, by executing the random number generation program, samples one random number from within the range of numbers 0 to 255. Meanwhile, the main CPU 41, referring to the flag or the like set in the RAM 43, selects an effect table corresponding to a gaming mode from among effect tables stored in the RAM 43. Then, the main CPU 41, referring to the effect table, selects an effect corresponding to the sampled random number. For example, the main CPU 41, when the losing lizhi flag is set to "ON", selects the effect by referring to a lizhi effect table for when setting the losing lizhi flag (refer to FIG. 7A). Also, the main CPU 41, when the bonus game lizhi flag is set to "ON", selects the effect by referring to a lizhi effect table for when setting the bonus lizhi flag (refer to FIG. 7B).

FIG. 7A is a diagram showing an example of the lizhi effect table for when setting the losing lizhi flag.

Effects "normal lizhi", "telescope lizhi (failure)" and "bird lizhi (failure)" have their appearance ratios fixed by allotting them respectively with the random numbers (not shown) belonging to the prescribed range of numbers. Also, in the effect "normal lizhi", a non-transmission display is not carried out, and a lizhi period is also short. Meanwhile, in the effects "telescope lizhi (failure)" and "bird lizhi (failure)", the non-transmission display is carried out, and the lizhi period is also long (a so-called long lizhi).

FIG. 7B is a diagram showing an example of the lizhi effect table for when setting the bonus lizhi flag.

Effects "normal lizhi", "telescope lizhi (success)", "telescope lizhi (comeback)", "bird lizhi (success) and "bird lizhi (comeback)" have their appearance ratios fixed by allotting them respectively with random numbers (not shown) belonging to the prescribed range of numbers. Also, in the effect "normal lizhi", the non-transmission display is not carried out, and the lizhi period is also short. Meanwhile, in the effects "telescope lizhi (success)", "telescope lizhi (comeback)", "bird lizhi (success) and "bird lizhi (comeback)", the non-transmission display is carried out, and the lizhi period is also long (the long lizhi). Each heretofore described effect will be described in detail hereafter.

Next, the main CPU 41 starts a rotation of all the reels 14 (step S15). Subsequently, the main CPU 41 judges whether or not the effect selected in step S14 is accompanied by the non-transmission display (step S16) and, if it judges that the effect is accompanied by the non-transmission display, carries out a control of putting display areas (the display windows 15) in front of all the reels 14 into the non-transmissive condition (step S17). Next, the CPU 41 enlarges and variably displays a symbol image corresponding to a last stop symbol (step S18). Then, the main CPU 41 carries out the effect determined in the process of step S14 (step S19). The main CPU 41 carries out, for example, a process of displaying an image corresponding to the heretofore described effect on each image display panel 16 and 33, or emitting a sound (background music, a sound effect, a voice or the like) corresponding to the image from the speaker 29.

Subsequently, the main CPU 41 judges whether or not a time has come to stop one of the three reels 14 (step S20) and, if it judges that the time has come, carries out a process of stopping a rotation of the relevant reel 14 (step S21), while the main CPU 41, if it judges that the time has not come to stop the reel 14, returns the process to step S19. In a case of stopping a last rotating reel 14, in the event that the long lizhi has been selected in step S14, the main CPU 41 sets a rotation period (a symbol varying display period) of the reel 14 which stops last to be long. Continuing on, the main CPU 41 judges whether or not all the reels 14 have stopped (step S22) and, if not all the reels 14 have stopped, returns the process to step S19, and repeats the processes of steps S19 to S21 until all the reels 14 stop.

If all the reels 14 have stopped, the main CPU 41 judges whether or not the symbol image is displayed (step S23) and, if it judges that the symbol image is displayed, carries out a process of stop displaying a symbol image showing a symbol corresponding to the last stop symbol stop displayed (step S24) The main CPU 41, if it judges in step S23 that the symbol image is not displayed, or if it has executed the process of step S24, judges whether or not the bonus game trigger has been established (step S25). The main CPU 41, if it judges that the bonus game trigger has been established, reads a program for carrying out the bonus game from the RAM 43, and executes a bonus game process (step S26).

Meanwhile, the main CPU 41, if it judges that the bonus game trigger has not been established, judges whether or not a winning combination has been established (step S27). The main CPU 41, if it judges that a winning combination has been established, carries out a payout of coins corresponding to the insertion quantity and the winning combination (step S28).

In a case of carrying out a storing of coins, the main CPU 41 carries out a process of adding the credit quantity stored in the RAM 43. Meanwhile, in a case of carrying out the payout of coins, the main CPU 41 transmits the control signal to the hopper 66, and carries out a payout of a prescribed number of coins. After the process of step S16, the main CPU 41, after the process of step S19, or if it judges in step S27 that no winning combination has been established, finishes this sub-routine.

Next, a description will be given, using FIGS. 8A to 14, of an image which is displayed on the lower image display panel 16 by the process of step S19 of the sub-routine shown in FIG. 5 being carried out.

FIGS. 8A to 14 are views showing examples of the image displayed on the lower image display panel.

In FIGS. 8A to 14, N designates a non-transmissive area, and T1 to T3 designate transmissive areas. The reels 14L, 14C and 14R become visible via the transmissive areas T1 to T3 respectively. C designates a main character, and B designates a bird character. S designates a field of view of a telescope.

Telescope Lizhi (Success)

Figure 8A:
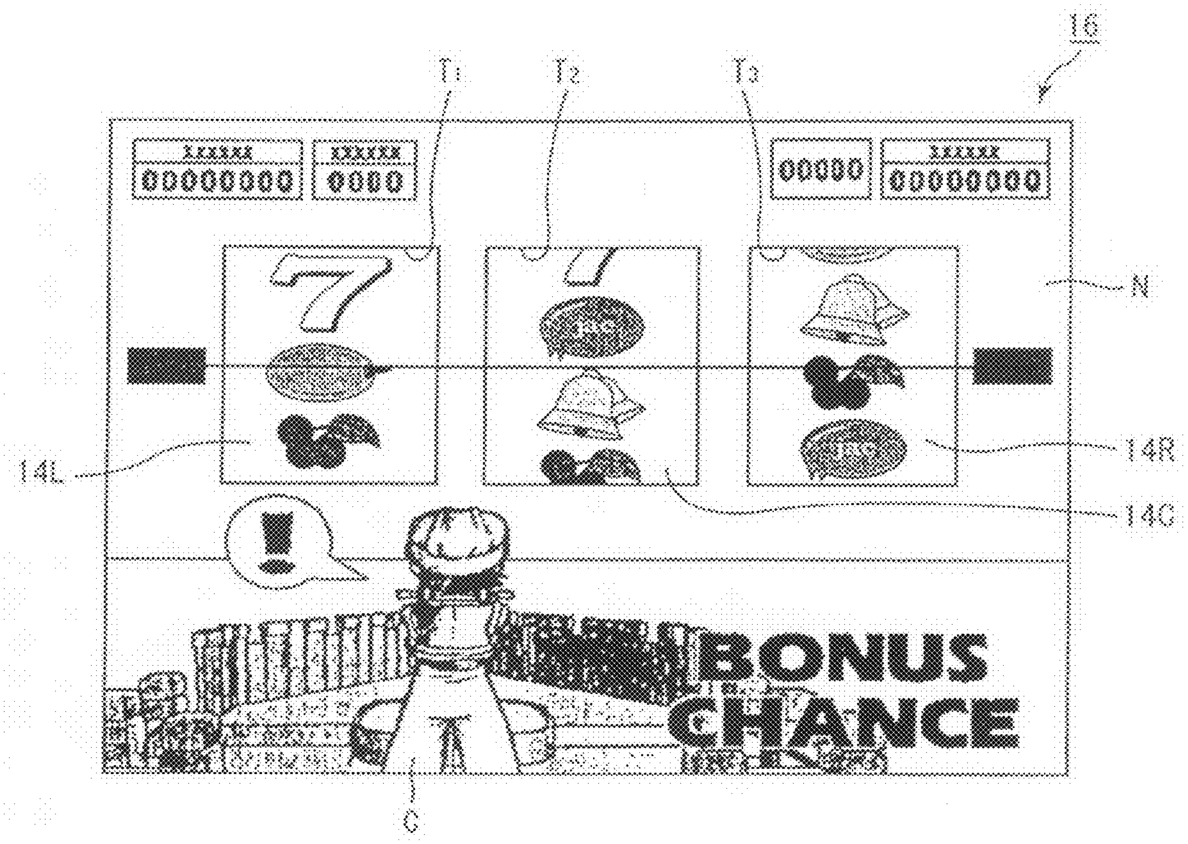
FIGS. 8A and 8B are views showing an example of an image displayed on a lower image display panel.
Figure 8B:
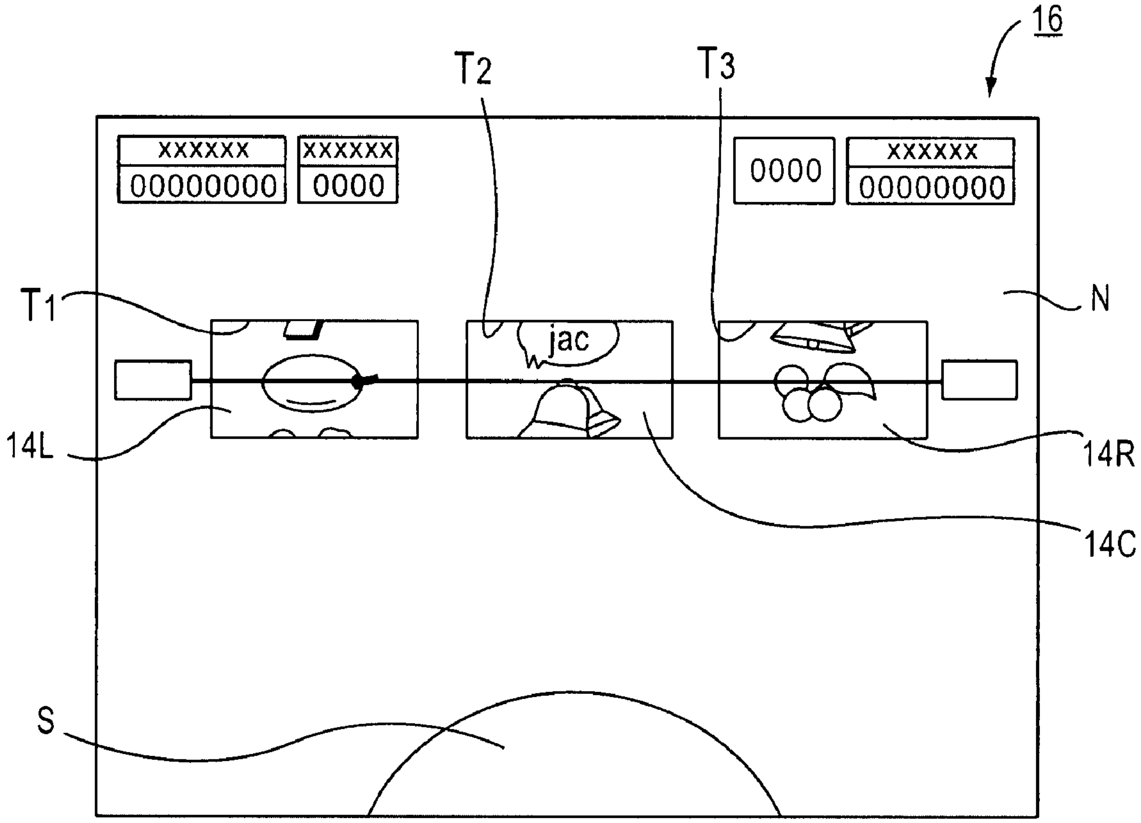
Figure 9A:
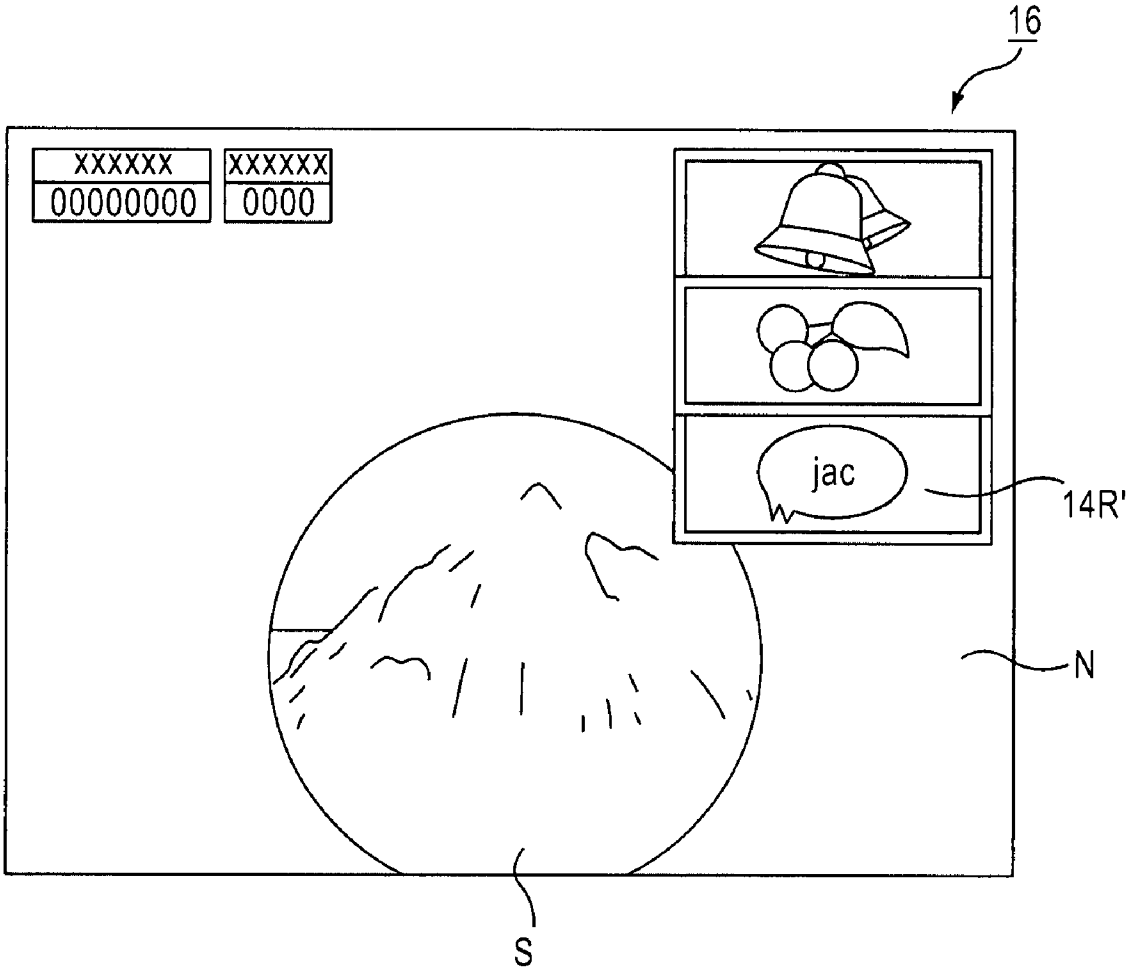
FIGS. 9A and 9B are views showing an example of an image displayed on the lower image display panel.
Figure 9B:
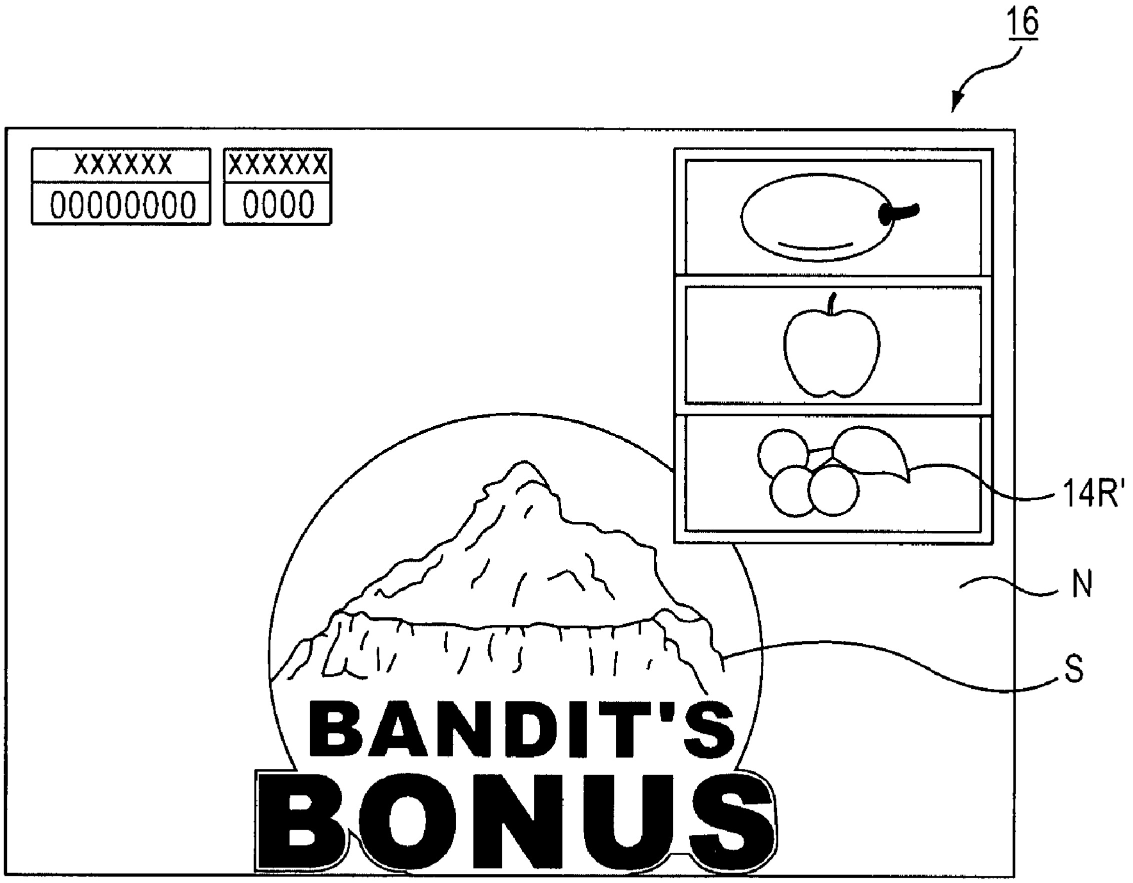

When the SPIN button 23 (refer to FIG. 4) is depressed, the image shown in FIG. 8A is displayed on the lower image display panel 16. As shown in FIG. 8A, an image representing the main character C on a voyage is displayed in the non-transmissive area N of the lower image display panel 16. Meanwhile, portions corresponding to the display windows 15 (not shown) becoming the transmissive areas T1 to T3, the reels 14L, 14C and 14R are visible via the transmissive areas T1 to T3. Subsequently, the image switches to a scene of looking through the telescope and, as shown in FIG. 8B, an image S representing the field of view of the telescope is displayed in a form of moving from the bottom to the top of the lower image display panel 16. At this time, a control of putting portions in front of the reels 14L, 14C and 14R into the non-transmissive condition is carried out, and the transmissive areas T1 to T3 narrow gradually and vanish. Next, as shown in FIG. 9A, a display of a symbol image 14R' showing the symbols depicted on the right reel 14R is started and, subsequently, the symbol image 14R' is variably displayed. Furthermore, an image representing a foggy shadow is displayed in the image S representing the field of view of the telescope. Also, the varying display period of the symbol image 14R' is longer than the rotation period of the reel 14R in the "normal lizhi" (refer to FIG. 7B) in which no non-transmission control is carried out (the long lizhi). Subsequently, as shown in FIG. 9B, an image is displayed in which the fog has cleared and a ghost ship appears. Then, the symbol image 14R' is stop displayed in a form of showing the bonus game trigger. In this case, the bonus game is subsequently carried out.

Telescope Lizhi (Failure)

Figure 10A:
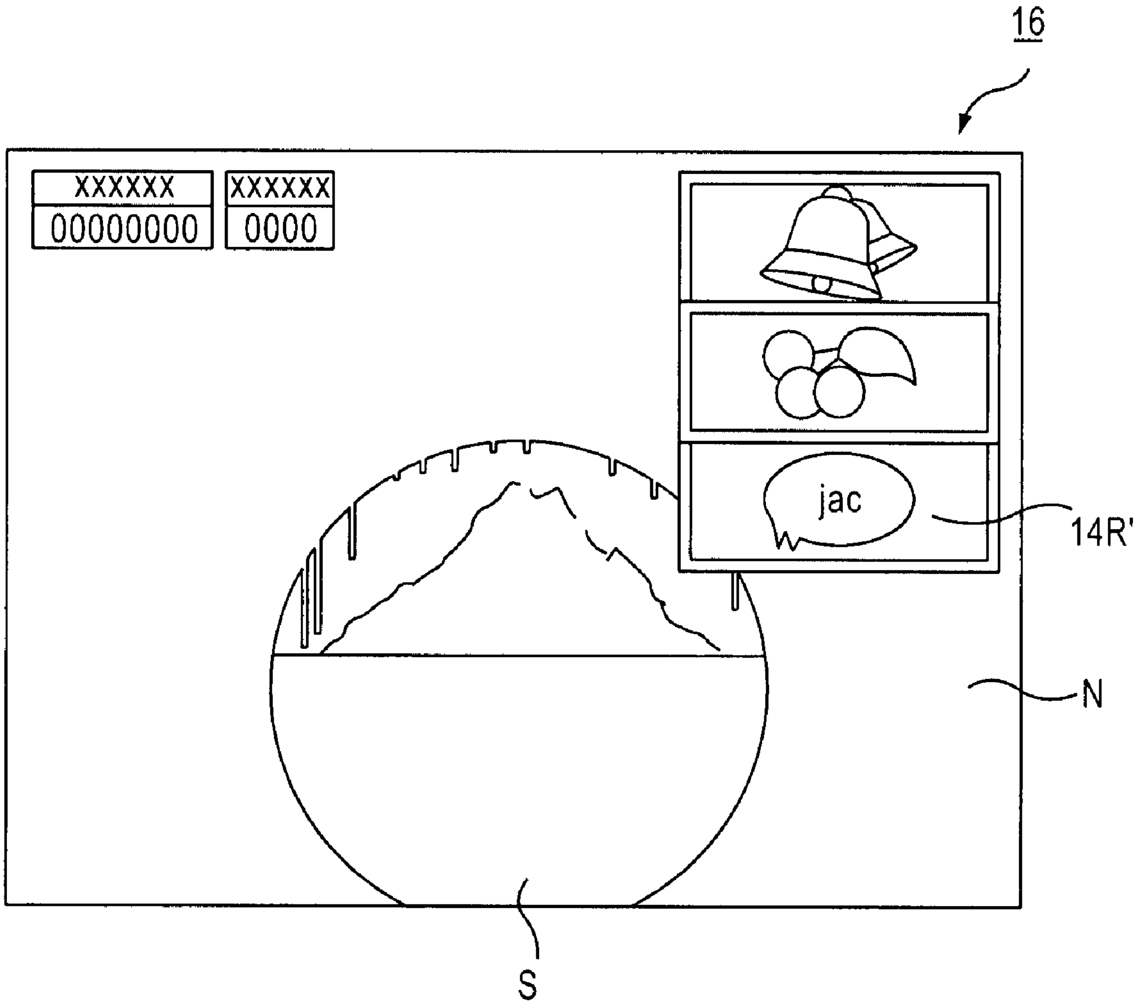
FIGS. 10A and 10B are views showing an example of an image displayed on the lower image display panel.

After the image shown in FIG. 9A is displayed, as shown in FIG. 10A, as well as an image in which the fog has cleared and a mirage appears being displayed, the symbol image 14R' may be stop displayed in a form of showing a symbol (in the figure, "CHERRY") other than the bonus game trigger. In this case, no bonus game is subsequently carried out.

Telescope Lizhi (Comeback)

Figure 10B:
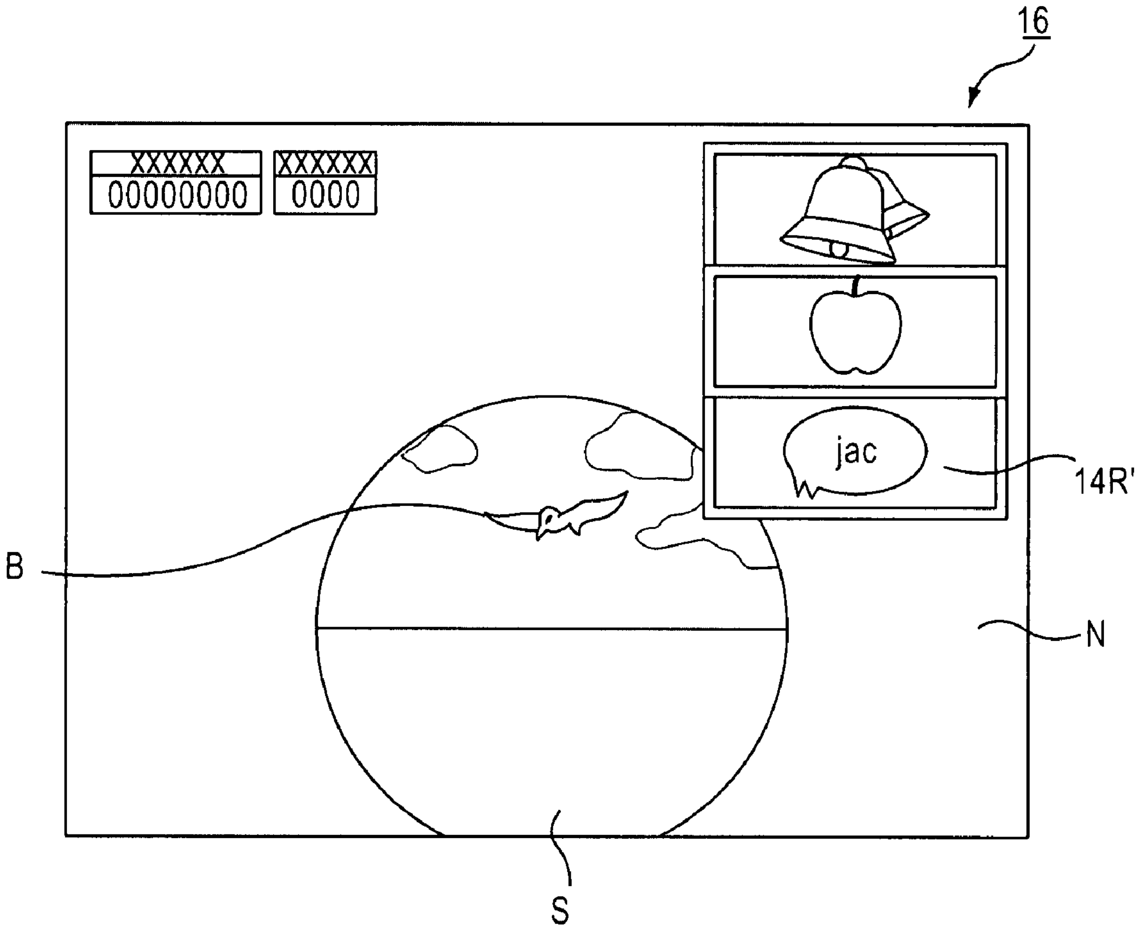

After the image shown in FIG. 10A is displayed, the varying display of the symbol image 14R' is started again and, as shown in FIG. 10B, a color of the image S representing the field of view of the telescope becomes dark, and an image representing the bird character B may be displayed therein. In this case, the symbol image 14R' is subsequently stop displayed in a form of showing the bonus game trigger, and the bonus game is carried out.

Bird Lizhi (Success)

Figure 11A:
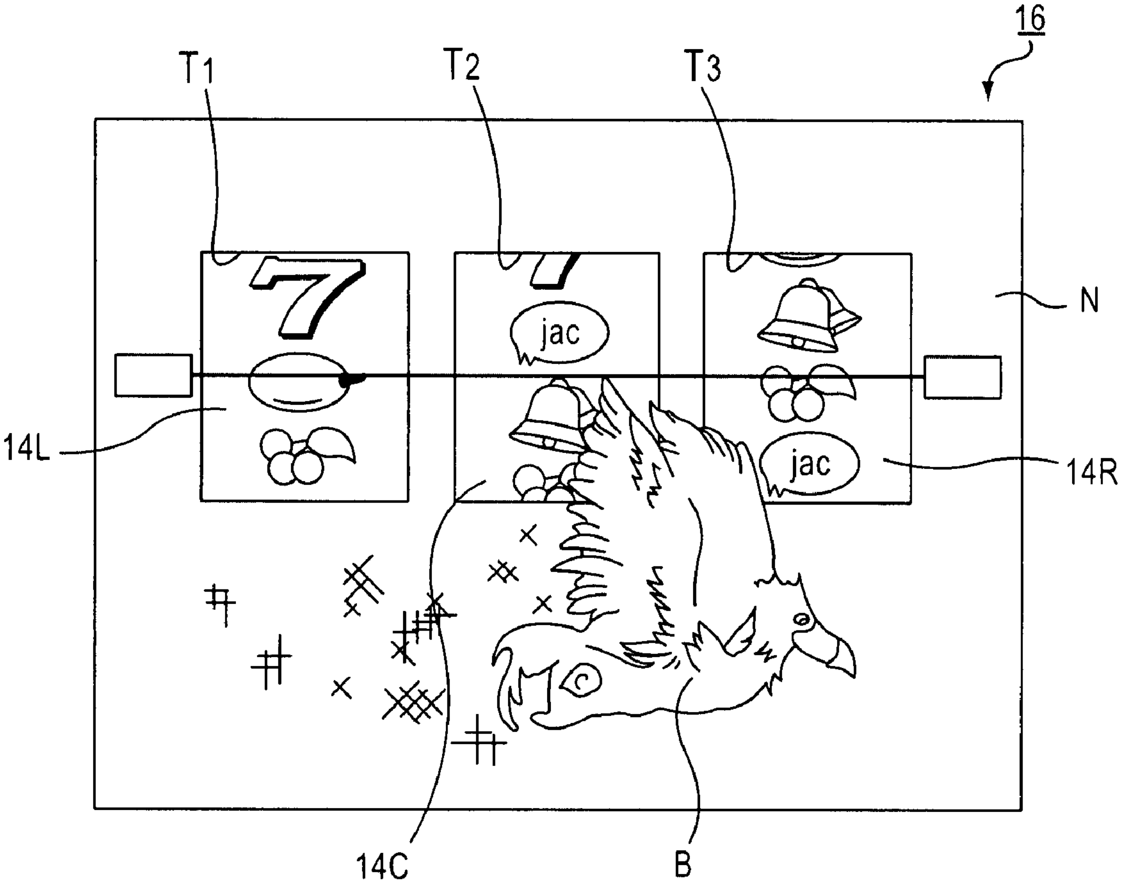
FIGS. 11A and 11B are views showing an example of an image displayed on the lower image display panel.
Figure 11B:
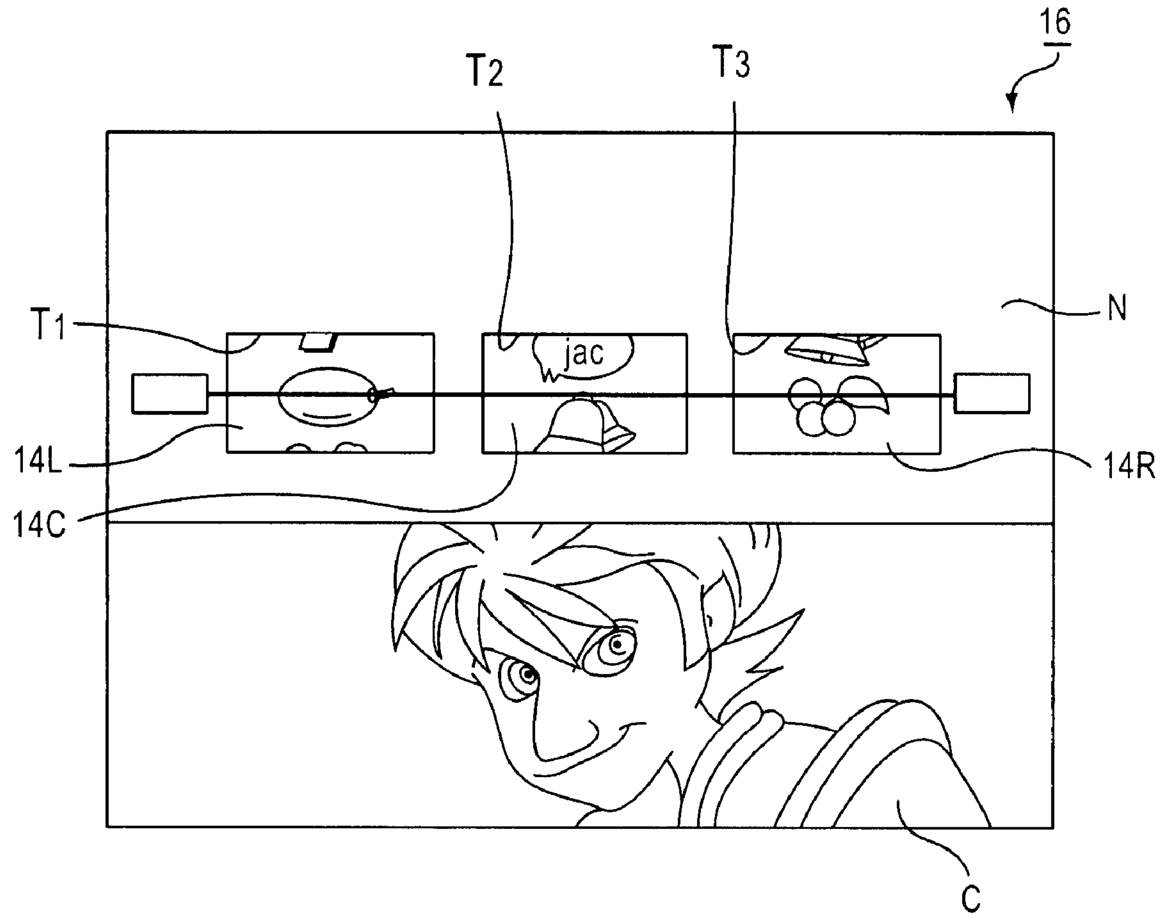
Figure 12A:
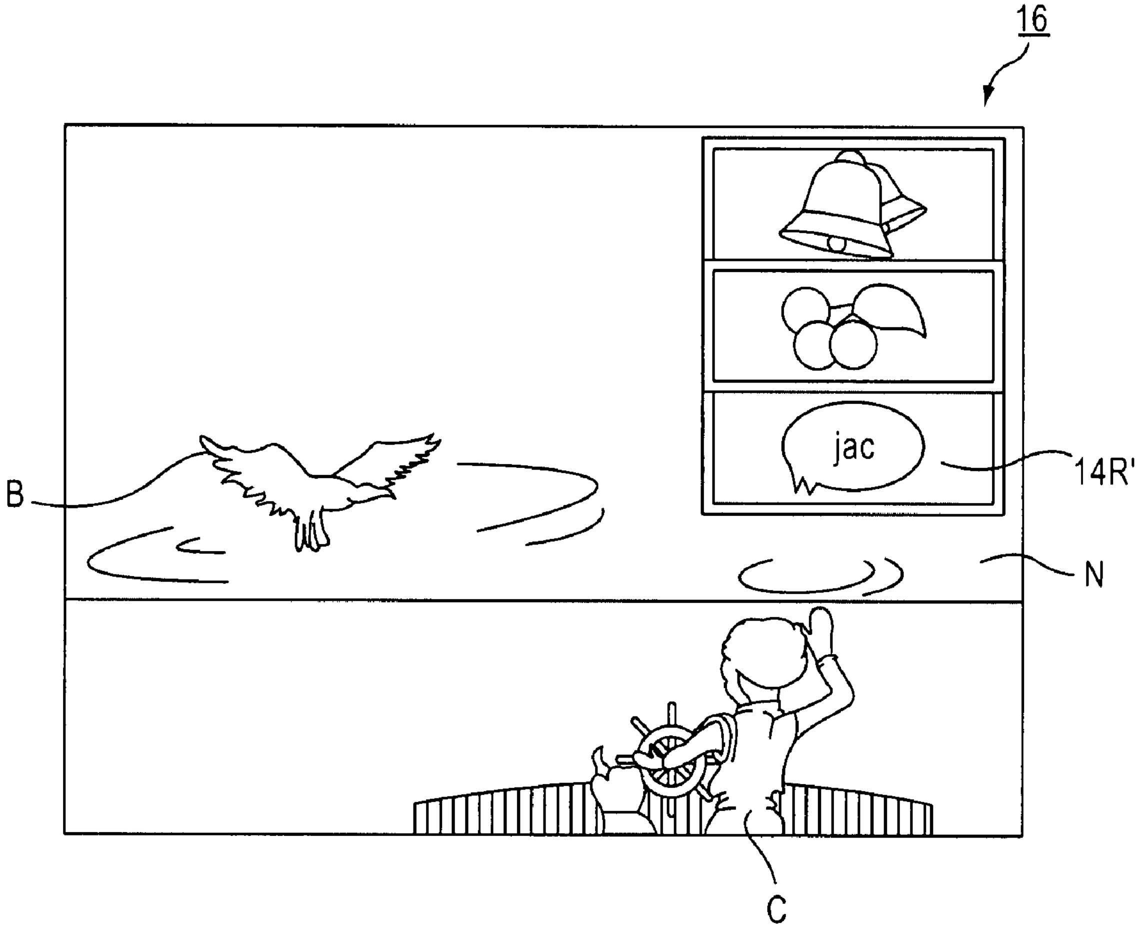
FIGS. 12A and 12B are views showing an example of an image displayed on the lower image display panel.

When the SPIN button 23 (refer to FIG. 4) is depressed, the image shown in FIG. 11A is displayed on the lower image display panel 16. As shown in FIG. 11A, the image representing the bird character B is displayed in the non-transmissive area N of the lower image display panel 16 in a form of crossing a screen. Meanwhile, the portions corresponding to the display windows 15 (not shown) becoming the transmissive areas T1 to T3, the reels 14L, 14C and 14R are visible via the transmissive areas T1 to T3. Subsequently, an image representing a face of the main character C is displayed in a cut-in form. At this time, the control of putting the portions in front of the reels 14L, 14C and 14R into the non-transmissive condition is carried out, and the transmissive areas T1 to T3 narrow gradually and vanish. Next, as shown in FIG. 12A, the display of the symbol image 14R' showing the symbols depicted on the right reel 14R is started and, subsequently, the symbol image 14R' is variably displayed. Furthermore, an image representing an aspect in which the main character C tries to catch the bird character using a rope is displayed. Also, the varying display period of the symbol image 14R' is longer than the rotation period of the reel 14R in the normal lizhi (refer to FIG. 7B) in which no non-transmission control is carried out (the long lizhi). Subsequently, an image representing in enlarged dimension the rope flying toward the bird character is displayed (refer to FIG. 13A).

Figure 12B:
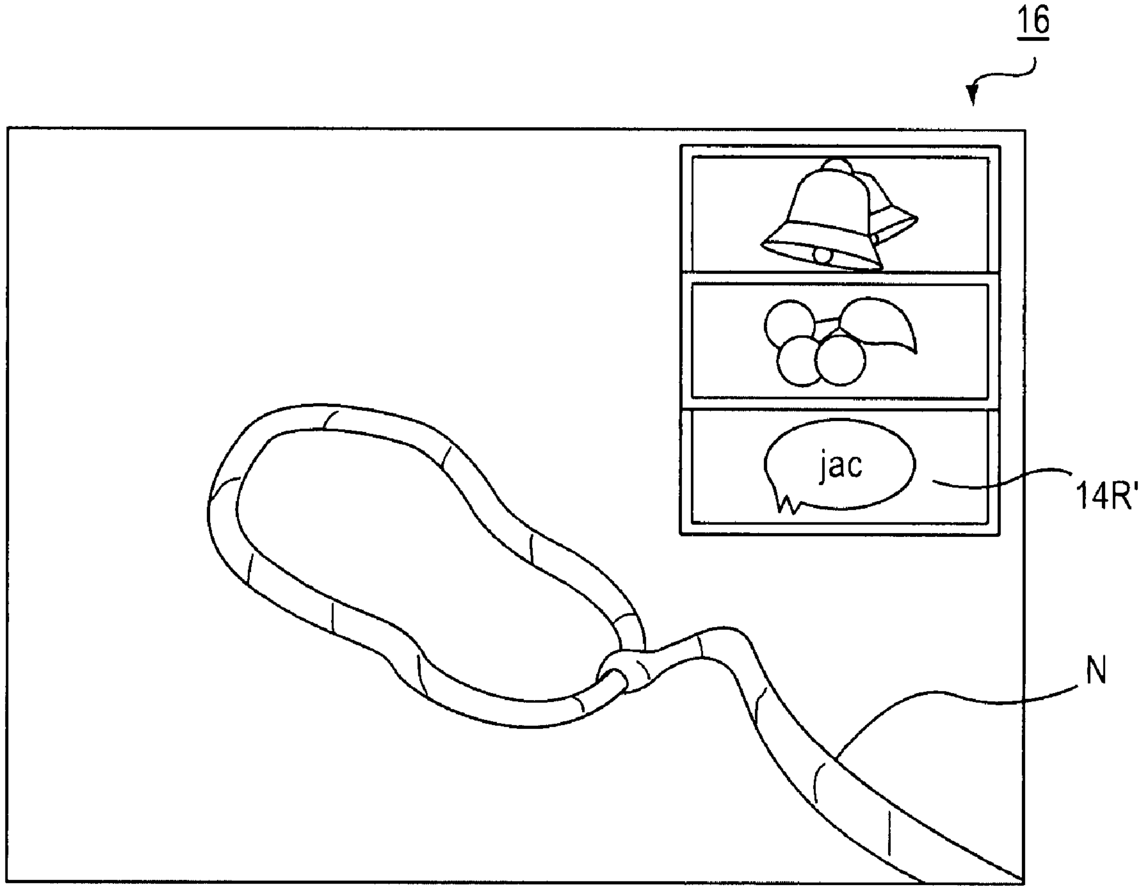

When an image representing an aspect in which the bird character is caught with the rope is displayed, as shown in FIG. 12B, an image representing an aspect in which the main character C rides on the bird character and aims for a treasure is displayed. Then, the symbol image 14R' is stop displayed in the form of showing the bonus game trigger. In this case, the bonus game is subsequently carried out.

Bird Lizhi (Failure)

Figure 13A:
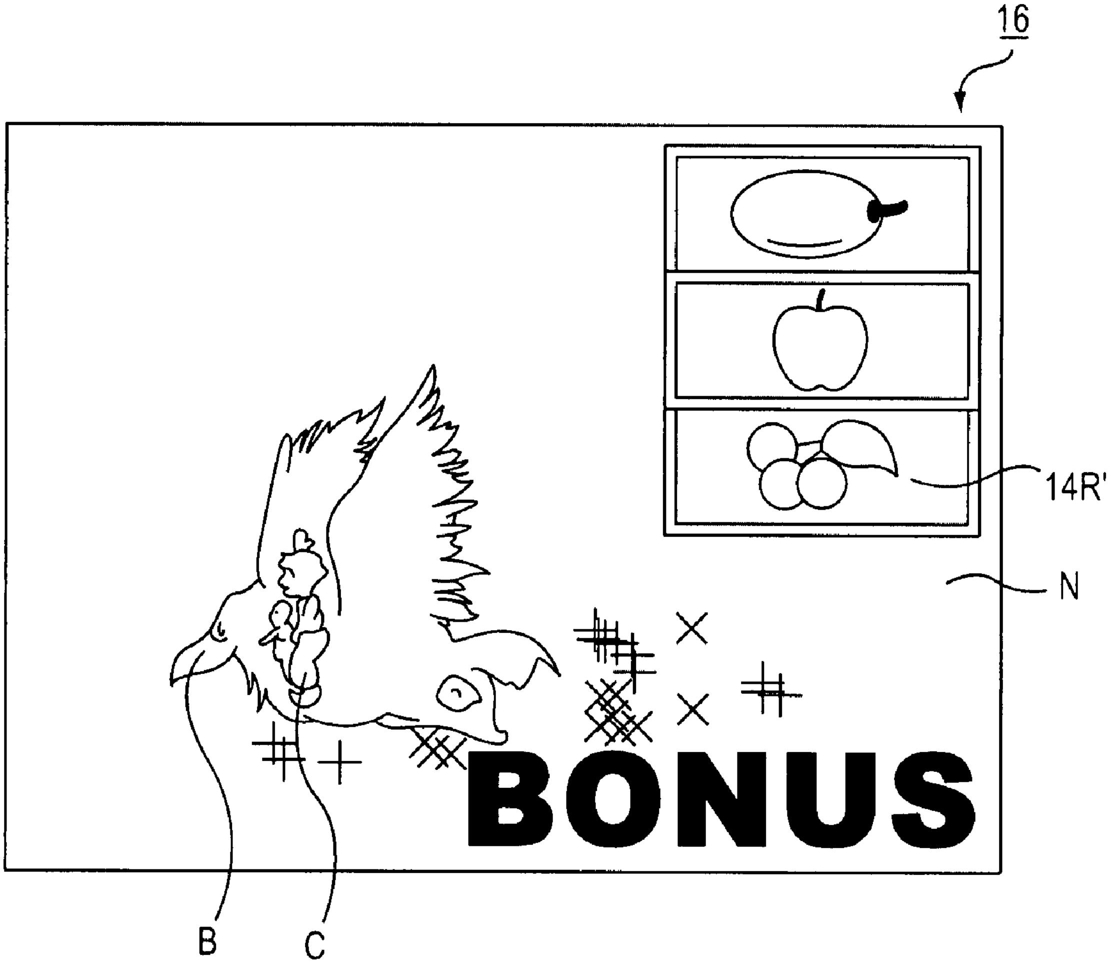
FIGS. 13A and 13B are views showing an example of an image displayed on the lower image display panel.
Figure 13B:
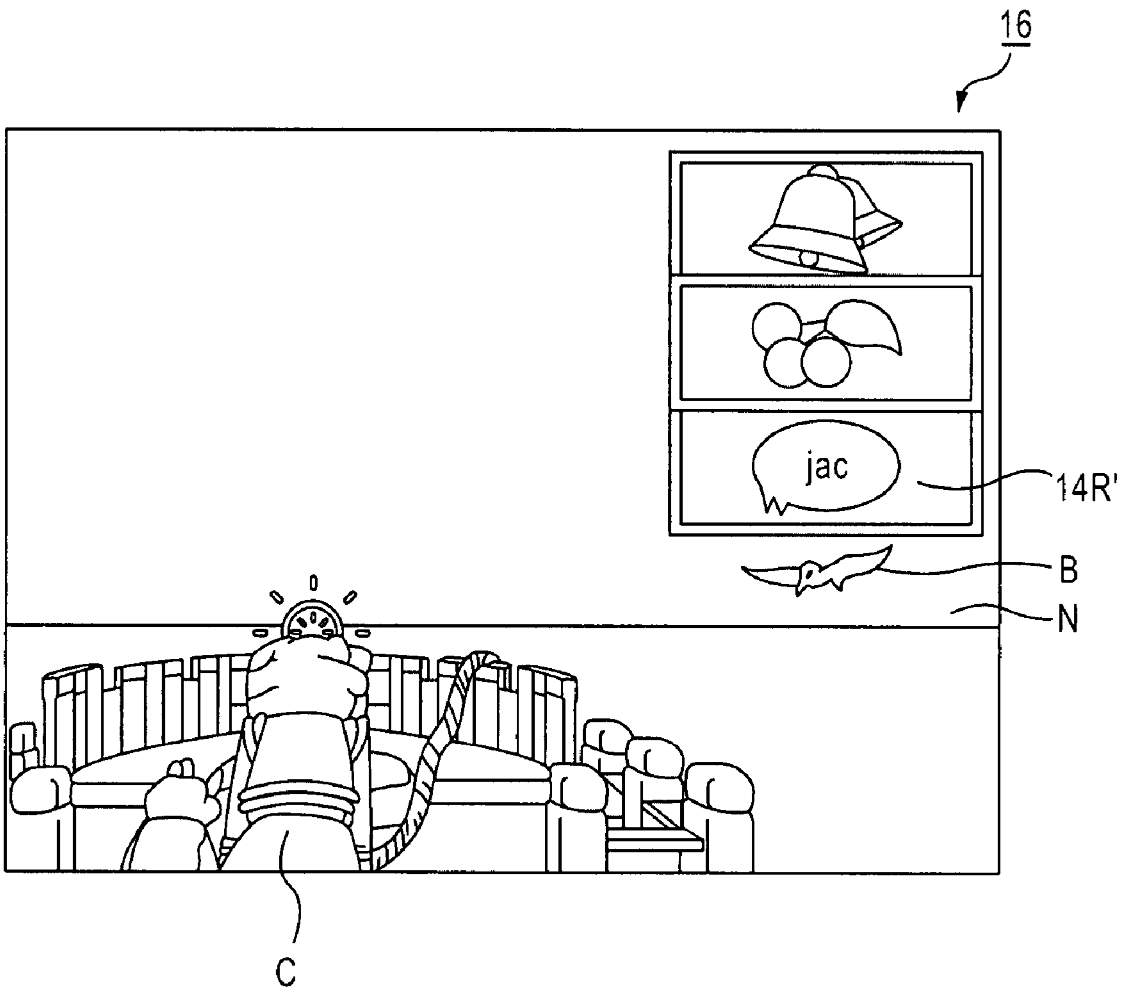

After the image shown in FIG. 12B is displayed, an image representing an aspect in which the bird character has not been caught with the rope is displayed, as shown in FIG. 13B, an image representing an aspect in which, as well as the bird character B fleeing, the main character C is disappointed is displayed, and the symbol image 14R' may be stop displayed in a form of showing a symbol (in the figure, "CHERRY") other than the bonus game trigger. In this case, no bonus game is subsequently carried out.

Bird Lizhi (Comeback)

Figure 14:
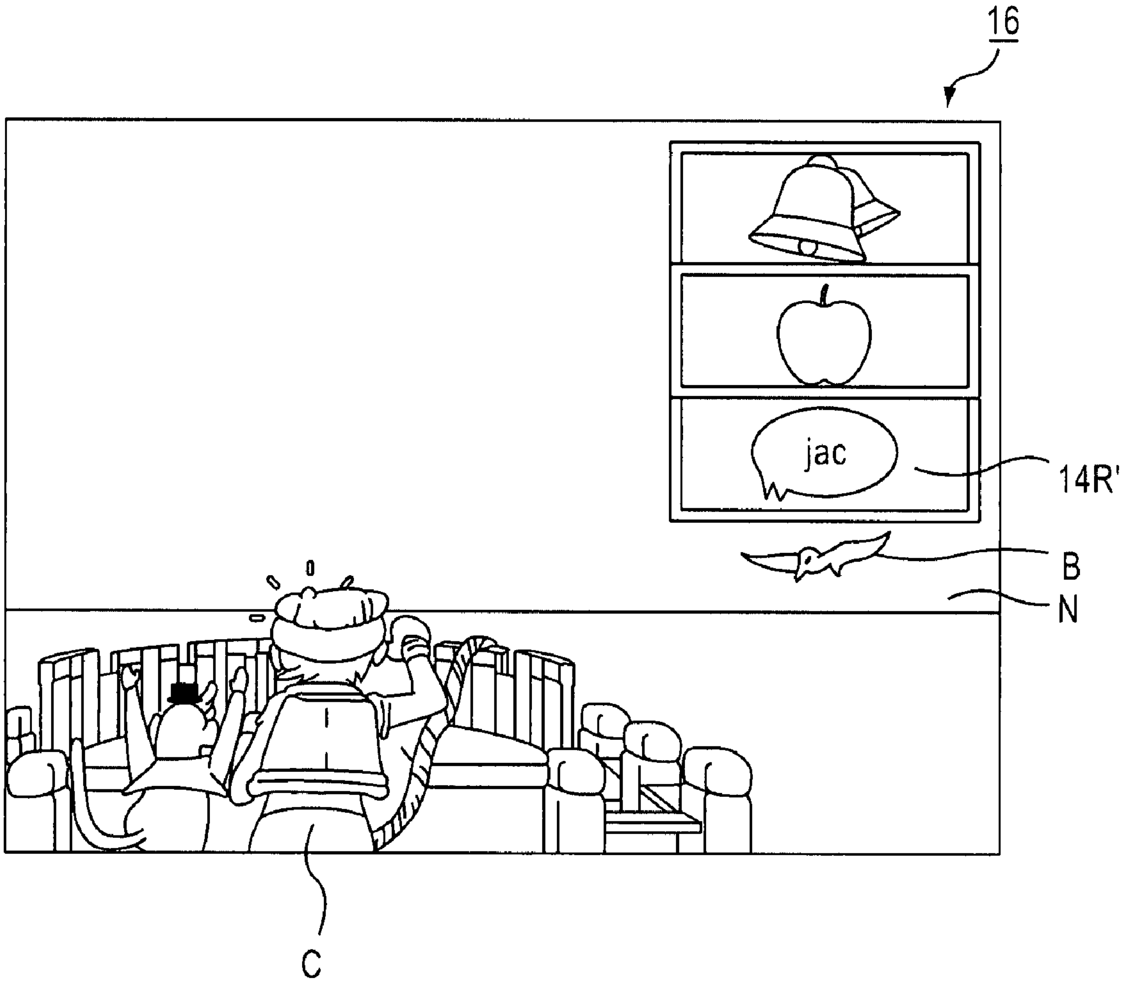
FIG. 14 is a view showing an example of an image displayed on the lower image display panel.

After the image shown in FIG. 13B is displayed, the varying display of the symbol image 14R' is started again and, as shown in FIG. 14, an image representing an aspect in which, as well as the bird character B coming back, the main character C is delighted may be displayed. In this case, subsequently, the symbol image 14R' is stop displayed in the form of showing the bonus game trigger, and the bonus game is carried out.

As described heretofore, the gaming machine 10 according to the invention, being provided with the lower image display panel 16, which can display an image and can be switched to the transmissive condition or the non-transmissive condition, in front of a plurality of symbols which can be variably displayed, in the event that a combination of the plurality of symbols reaches the lizhi, executes a process of, as well as putting portions in front of the plurality of symbols into the non-transmissive condition, variably displaying a symbol image corresponding to the last stop symbol on the lower image display panel 16. Also, the gaming machine 10 executes a process of making the varying display period of the symbol image longer than the varying display period of the last stop symbol in a case in which no symbol image is displayed. Also, the gaming machine 10, in the event that the lizhi occurs, executes a process of, as well as putting the portions in front of the plurality of symbols into the non-transmissive condition on condition that the image displayed on the lower image display panel 16 is a specified image (for example, the telescope lizhi or the bird lizhi), variably displaying the symbol image corresponding to the last stop symbol on the lower image display panel 16. Also, the gaming machine 10, immediately after the varying display of the plurality of symbols is started, executes the process of, as well as putting the portions in front of the plurality of symbols into the non-transmissive condition, variably displaying the symbol image corresponding to the last stop symbol on the lower image display panel 16.

Also, the gaming machine 10 executes a game control method of the invention in the following way.

That is, the gaming machine 10, in the event that the combination of the plurality of symbols reaches the lizhi, as well as putting the plurality of symbols into an invisible condition, variably displays the symbol image corresponding to the last stop symbol. Also, the gaming machine 10 makes the varying display period of the symbol image longer than the varying display period of the last stop symbol in the case in which no symbol image is displayed. Also, the gaming machine 10, in the event that the lizhi occurs, as well as putting the plurality of symbols into the invisible condition on condition that the image displayed on the lower image display panel 16 is the specified image, variably displays the symbol image corresponding to the last stop symbol. Also, the gaming machine 10, immediately after the varying display of the plurality of symbols is started, as well as putting the plurality of symbols into the invisible condition, variably displays the symbol image corresponding to the last stop symbol.

In the invention, as described using FIG. 8A to 10B, it is possible to employ a configuration in which, in a case in which is executed a display control of, as well as putting the display areas positioned in front of the plurality of symbol columns into the non-transmissive condition, carrying out the varying display of the symbol image corresponding to the last stop symbol, the image S representing the field of view of the telescope is displayed on a screen of the second display device which has come into the non-transmissive condition, and furthermore, when the bonus game occurs, an image representing an aspect in which a prescribed phenomenon (for example, a phenomenon in which the fog has cleared and the ghost ship appears) occurs is displayed in the image representing the field of view.

Also, in the invention, as described using FIGS. 11A to 14, it is possible to employ a configuration in which, in the case in which the heretofore described display control is carried out, an ally character (for example, the main character C) and a target character (for example, the bird character B) are displayed on the screen of the second display device which has taken on the non-transmissive condition, and furthermore, when the bonus game occurs, an image representing an aspect in which the ally character succeeds in catching the target character is displayed.

Although the embodiment of the invention has been described heretofore, it merely exemplifying a specific example and not particularly limiting the invention, a specific configuration of each component or the like can be changed in design as appropriate. Also, the advantages described in the embodiment of the invention being derived by merely citing most preferred advantages resulting from the invention, the advantages due to the invention are not limited to the ones described in the embodiment of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A gaming machine comprising:

a first display device configured to display a plurality of symbols associated with an outcome of a wagering game, wherein the plurality of symbols can be variably displayed and stop displayed;

a second display device positioned in front of the first display device, the second display device being configured to display an image, wherein the second display device is operable to be switched between a transmissive condition and a non-transmissive condition; and a controller configured to control the first and second display devices, wherein the controller, in response to a case in which a combination of the plurality of symbols reaches a condition in which it lacks one symbol of a prescribed combination, directs the second display device to:

switch corresponding portions thereof in front of the plurality of symbols from the transmissive condition into the non-transmissive condition, display on the second display device a symbol-bearing reel image with a symbol image corresponding to a last stop displayed symbol displayed on the first display device, and depict the symbol-bearing reel image as spinning then stopping to reveal a plurality of symbol images such that the symbol image corresponding to the last stop displayed symbol is replaced with a new symbol image.

2. The gaming machine according to claim 1, wherein the controller makes a varying display period during which the symbol-bearing reel image is depicted as spinning longer than a varying display period of the last stop displayed symbol.

3. The gaming machine according to claim 1, wherein the controller directs the second display device to depict the symbol-bearing reel image as spinning in response to the case in which the combination of the plurality of symbols reaches the condition, and on condition that the image displayed on the second display device is a specified image and the portions in front of the plurality of symbols are switched into the non-transmissive condition.

4. The gaming machine according to claim 1, wherein the controller, immediately after the varying display of the plurality of symbols is started and the portions in front of the plurality of symbols switch into the non-transmissive condition, directs the second display device to depict the symbol-bearing reel image as spinning.

5. The gaming machine according to claim 1, wherein the controller directs the second display device to depict the symbol-bearing reel image as spinning in response to a case in which the combination becomes a combination corresponding to a gaming mode advantageous to a player and the portions in front of the plurality of symbols are switched into the non-transmissive condition.

6. The gaming machine according to claim 1, wherein switching a portion of the second display device to the transmissive condition includes corresponding ones of the plurality of symbols on the first display device aligned with the portion of the second display device being at least generally visually perceptible from a front of the second display device.

7. The gaming machine according to claim 1, wherein switching a portion of the second display device to the non-transmissive condition includes corresponding ones of the plurality of symbols on the first display device aligned with the portion of the second display device being at least generally visually imperceptible from a front of the second display device.

8. The gaming machine according to claim 1, wherein the first display device is further configured to display a plurality of symbol-bearing reels each bearing at least some of the plurality of symbols associated with the outcome of the wagering game, and wherein the controller, in response to the condition, further directs the second display device to switch corresponding portions thereof into the non-transmissive condition such that one or more of the plurality of symbol-bearing reels are generally visually imperceptible to a player.

9. The gaming machine according to claim 8, wherein the controller, in response to the condition, further directs the second display device to display a symbol-bearing reel image on at least one of the portions switched to the non-transmissive condition.

10. The gaming machine according to claim 9, wherein the symbol-bearing reel image includes a recreation of the symbol-bearing reel that the at least one portion of the second display is rendering generally visually imperceptible to the player.

11. The gaming machine according to claim 10, wherein at least one of the symbol images of the symbol-bearing reel image displayed by the second display device is replaced with the lacking one symbol.

12. The gaming machine according to claim 10, wherein at least one of the symbol images of the symbol-bearing reel image displayed by the second display device is replaced with a randomly-determined symbol.

13. The gaming machine according to claim 8, wherein the controller, in response to the condition, further directs the second display device to display on a non-transmissive portion thereof information related to the wagering game.

14. A method of conducting a wagering game on a gaming device with a controller, the method comprising:

directing, via the controller, a first display device to display a plurality of symbols, the displaying including the symbols being variably displayed and stop displayed;

directing, via the controller, a second display device positioned in front of the first display device to display an image, the second display device being configured to be switched between a transmissive condition and a non-transmissive condition;

in response to a case in which a combination of the plurality of symbols reaches a condition in which it lacks one symbol of a prescribed combination, directing, via the controller, at least some portions of the second display device to switch to the non-transmissive condition such that at least some of the plurality of symbols on the first display device are generally invisible to a player;

directing, via the controller, the second display device to display a symbol-bearing reel image with a symbol image corresponding to a last stop displayed symbol on the second display device; and depicting the symbol-bearing reel image as spinning then stopping to reveal a plurality of symbol images such that the symbol image corresponding to the last stop displayed symbol is replaced with a new symbol image.

15. The method according to claim 14, wherein a varying display period during which the symbol-bearing reel image is depicted as spinning is longer than a varying display period of the last stop displayed symbol.

16. The method according to claim 14, wherein the symbol-bearing reel image is depicted as spinning in response to the case in which the combination of the plurality of symbols reaches the condition, and on condition that a specified image is displayed, and the at least some of the plurality of symbols being made generally invisible to a player.

17. The method according to claim 14, wherein, immediately after the varying display of the plurality of symbols is started and the at least some of the plurality of symbols are made generally invisible to a player, the the symbol-bearing reel image is depicted as spinning.

18. The method according to claim 14, wherein the symbol-bearing reel image is depicted as spinning in response to a case in which the combination becomes a combination corresponding to a gaming mode advantageous to a player and the at least some of the plurality of symbols being made generally invisible to a player.

19. A gaming system for displaying one or more outcomes of a wagering game, the outcomes being randomly determined from a plurality of wagering game outcomes, the gaming system comprising:

a variable display device configured to display a plurality of symbol-bearing reels each having at least some of the plurality of symbols associated with the outcomes of the wagering game;

a transmissive display device facing the variable display device, at least some portions of the transmissive display device being selectively operable to transition between a transmissive condition and a non-transmissive condition; and a controller operatively connected to the transmissive display device, the controller being configured to direct the transmissive display device to:

transition a portion thereof from the transmissive condition to the non-transmissive condition such that at least one of the symbol-bearing reels aligned with the portion is generally visually imperceptible through the transmissive display device;

display a symbol-bearing reel image at the portion transitioned to the non-transmissive condition, the reel image being a recreation of the at least one symbol-bearing reel rendered generally visually imperceptible; and replace at least one of the symbol images of the symbol-bearing reel image with a new symbol image of one of the plurality of symbols, wherein replacing the at least one of the symbol images includes depicting the symbol-bearing reel image as spinning then stopping to reveal a plurality of symbol images.

20. The gaming system of claim 19, wherein the transitioning a portion of the transmissive display from the transmissive condition to the non-transmissive condition is in response to a case in which the outcome of the wagering game displayed by the variable display device includes a combination of symbols which lacks one symbol of a prescribed combination.

21. The gaming system of claim 20, wherein the replaced at least one symbol image includes a symbol image of the lacking one symbol.

22. The gaming system of claim 20, wherein the replaced at least one symbol image includes an image of a randomly-determined symbol.

23. The gaming system of claim 20, wherein the transitioning includes transitioning corresponding portions of the transmissive display from the transmissive condition to the non-transmissive condition such that all of the symbol-bearing reels are generally visually imperceptible through the transmissive display device.

* * * * *